United States Patent
Krass et al.

(10) Patent No.: US 10,847,081 B2
(45) Date of Patent: *Nov. 24, 2020

(54) CONFIGURABLE LIGHTING DEVICE INCORPORATING NOISE REDUCTION

(71) Applicant: ABL IP HOLDING LLC, Conyers, GA (US)

(72) Inventors: Robert M. Krass, Ashburn, VA (US); Peter Yi Yan Ngai, Alamo, CA (US); David P. Ramer, Reston, VA (US); Gregory Malone, Sterling, VA (US); Rashmi Kumar Rogers, Herndon, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 267 days.

This patent is subject to a terminal disclaimer.

(21) Appl. No.: 15/974,746

(22) Filed: May 9, 2018

(65) Prior Publication Data

US 2019/0295458 A1 Sep. 26, 2019

Related U.S. Application Data

(63) Continuation-in-part of application No. 15/933,523, filed on Mar. 23, 2018.

(51) Int. Cl.
*G09G 3/32* (2016.01)
*G02B 6/10* (2006.01)
*F21V 8/00* (2006.01)

(52) U.S. Cl.
CPC ............. *G09G 3/32* (2013.01); *G02B 6/0025* (2013.01); *G02B 6/10* (2013.01); *G09G 2310/0264* (2013.01)

(58) Field of Classification Search
CPC ............ G09G 3/32; G02B 6/0025; G02B 6/10
See application file for complete search history.

(56) References Cited

U.S. PATENT DOCUMENTS

| 5,659,410 A | 8/1997 | Koike et al. |
| 7,677,359 B2 | 3/2010 | Vigran et al. |
| (Continued) | | |

FOREIGN PATENT DOCUMENTS

| CN | 202125844 U | 1/2012 |
| KR | 20110073404 A | 6/2011 |

OTHER PUBLICATIONS

Notice of Allowance for U.S. Appl. No. 15/948,401, dated May 21, 2019, 6 pages.
Non-Final Office Action for U.S. Appl. No. 15/933,523, dated Nov. 26, 2019, 18 pages.
Buzzispace Acosutic Lighting Catalog, downloaded from http://buzzi.space/wp-content/uploads/2015/01/Buzzispace_catalogLighting_WEB_20170428.pdf, dated Apr. 28, 2017, 43 pages.
(Continued)

*Primary Examiner* — Thomas M Sember
(74) *Attorney, Agent, or Firm* — RatnerPrestia

(57) ABSTRACT

An example configurable lighting device includes a controllable general illumination device configured to output illumination light sufficient for general illumination of an area and a display configured to output light as a representation of an image into the area. The display is co-located with the general illumination device such that an available output region of the display towards the area at least substantially overlaps an available output region of the general illumination device towards the area. The lighting device has a light output surface configured and located such that light output from the general illumination device and light output from the display propagate out via the light output surface. The lighting device also has a noise reduction structure.

20 Claims, 12 Drawing Sheets

(56) References Cited

U.S. PATENT DOCUMENTS

| | | |
|---|---|---|
| 8,780,673 B2 | 7/2014 | Cohen et al. |
| 9,851,094 B2 | 12/2017 | Gommans et al. |
| 2001/0026626 A1 | 10/2001 | Athanas |
| 2003/0223249 A1 | 12/2003 | Lee et al. |
| 2007/0200467 A1 | 8/2007 | Heydt et al. |
| 2009/0010477 A1 | 1/2009 | Frobisher |
| 2011/0129096 A1 | 6/2011 | Raftery |
| 2011/0158420 A1 | 6/2011 | Hannah |
| 2014/0140551 A1 | 5/2014 | Ramstein |
| 2014/0270279 A1 | 9/2014 | Jones |
| 2017/0292681 A1 | 10/2017 | Lin et al. |
| 2018/0005590 A1 | 1/2018 | Komanduri et al. |
| 2018/0018749 A1 | 1/2018 | Goodman et al. |
| 2018/0098139 A1 | 4/2018 | Arevalo Carreno et al. |

OTHER PUBLICATIONS

Thorlux Light Line Integra Acoustic Products, downloaded from http:///www.thorlux.com/luminaires/thorlux-light-line-integra-acoustic, May 3, 2018, 3 pages.
U.S. Appl. No. 15/948,401, filed Apr. 9, 2018, 45 pages.
U.S. Appl. No. 15/424,208, filed Feb. 3, 2017, 52 pages.
U.S. Appl. No. 15/467,333, filed Mar. 23, 2017, 44 pages.
U.S. Appl. No. 15/611,349, filed Jun. 1, 2017, 71 pages.
Entire patent prosecution history of U.S. Appl. No. 15/933,523, filed Mar. 23, 2018, entitled, "Noise Reducing Lighting Devices."
Entire patent prosecution history of U.S. Appl. No. 15/948,401, filed Apr. 9, 2018, entitled, "Active Sound Control in a Lighting System."
Non Final Office Action for U.S. Appl. No. 15/948,401, dated Jan. 28, 2019, 24 pages.
Notice of Allowance for U.S. Appl. No. 15/933,523, dated May 11, 2020, 7 pages.

CONFIGURABLE LIGHTING DEVICE INCORPORATING NOISE REDUCTION

CROSS-REFERENCE TO RELATED APPLICATION

The present application is a continuation-in-part of U.S. patent application Ser. No. 15/933,523, filed Mar. 23, 2018, entitled "NOISE REDUCING LIGHTING DEVICES," the entire contents of which are incorporated herein by reference.

TECHNICAL FIELD

The present subject matter relates to a lighting device, and to configurations and/or operations thereof, whereby the lighting device incorporates components for display and general illumination functions, for example, operations of which may be configurable by software, and in which the configurable lighting device includes one or more structures for reducing noise in the area served by the lighting device.

BACKGROUND

Electrically powered artificial lighting has become ubiquitous in modern society. Electrical lighting devices or luminaires, such as light fixtures or lamps, are commonly deployed, for example, in homes, buildings of commercial and other enterprise establishments, as well as in various outdoor settings.

More recently, there have been proposals to combine some degree of display capability with lighting functionalities. The Fraunhofer Institute, for example, has demonstrated lighting equipment using luminous tiles, each having a matrix of red (R) LEDs, green (G), blue (B) LEDs and white (W) LEDs as well as a diffuser film to process light from the various LEDs. The LEDs of the system were driven to simulate or mimic the effects of clouds moving across the sky. Although use of displays allows for variations in appearance that some may find pleasing, the displays or display-like devices are optimized for image output and do not provide particularly good illumination for general lighting applications. There have also been proposals to add controlled lighting devices to televisions sets. Other proposals suggest a light bulb like device that can serve alternately as an illumination light source and as a projector.

Combining display and illumination functions into a single device, however, may lead to unique problems; and there is still room for further technical improvements. For example, multiple configurable lighting devices may be utilized to provide display and general illumination to an entire region, such as an entire floor of an office or commercial establishment. Traditionally, lighting devices are distributed in a pattern across the ceiling or a wall of the region under illumination. The software configurable lighting devices may include broad, generally planar structures, such as optical diffusers or waveguide surfaces at the output, which reflect a large portion of any sound generated in the region under illumination. In installations with substantial space between the lighting devices, the intervening spaces often tend to deaden sound a reduce impact of sound reflection off of the planar structures of the lighting devices.

SUMMARY

Where a substantial number of the configurable lighting devices are mounted close together on the wall or ceiling or at about the same distance above the floor (e.g. hung from the ceiling), the sound reflective surfaces of the software configurable lighting devices may produce unwanted echo or noise, particularly where other surfaces in the area such as the floor or walls also reflect acoustic waves. The concepts disclosed herein alleviate the noted problems with acoustic reflections from configurable lighting devices, for example, that may appear as echoes or noise to persons in the area under illumination.

In an example, a configurable lighting device includes a controllable general illumination device configured to output illumination light sufficient for general illumination of an area and a display configured to output light as a representation of an image into the area. The display is co-located with the general illumination device such that an available output region of the display towards the area at least substantially overlaps an available output region of the general illumination device towards the area. The lighting device has a light output surface configured and located such that light output from the general illumination device and light output from the display propagate out via the light output surface. The lighting device also has a noise reduction structure.

A variety of examples of the noise reduction structure are disclosed in the drawings and detailed description. A variety of examples of the display and the general illumination device also appear in the drawings and are described in detail below. The description and drawings also encompass examples of systems that combine one or more of the configurable lighting devices with elements of an intelligent controller, such as a driver system and a processor, e.g. as may be configured to control the display and the general illumination device based on programming, image data and/or illumination light setting data.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1:
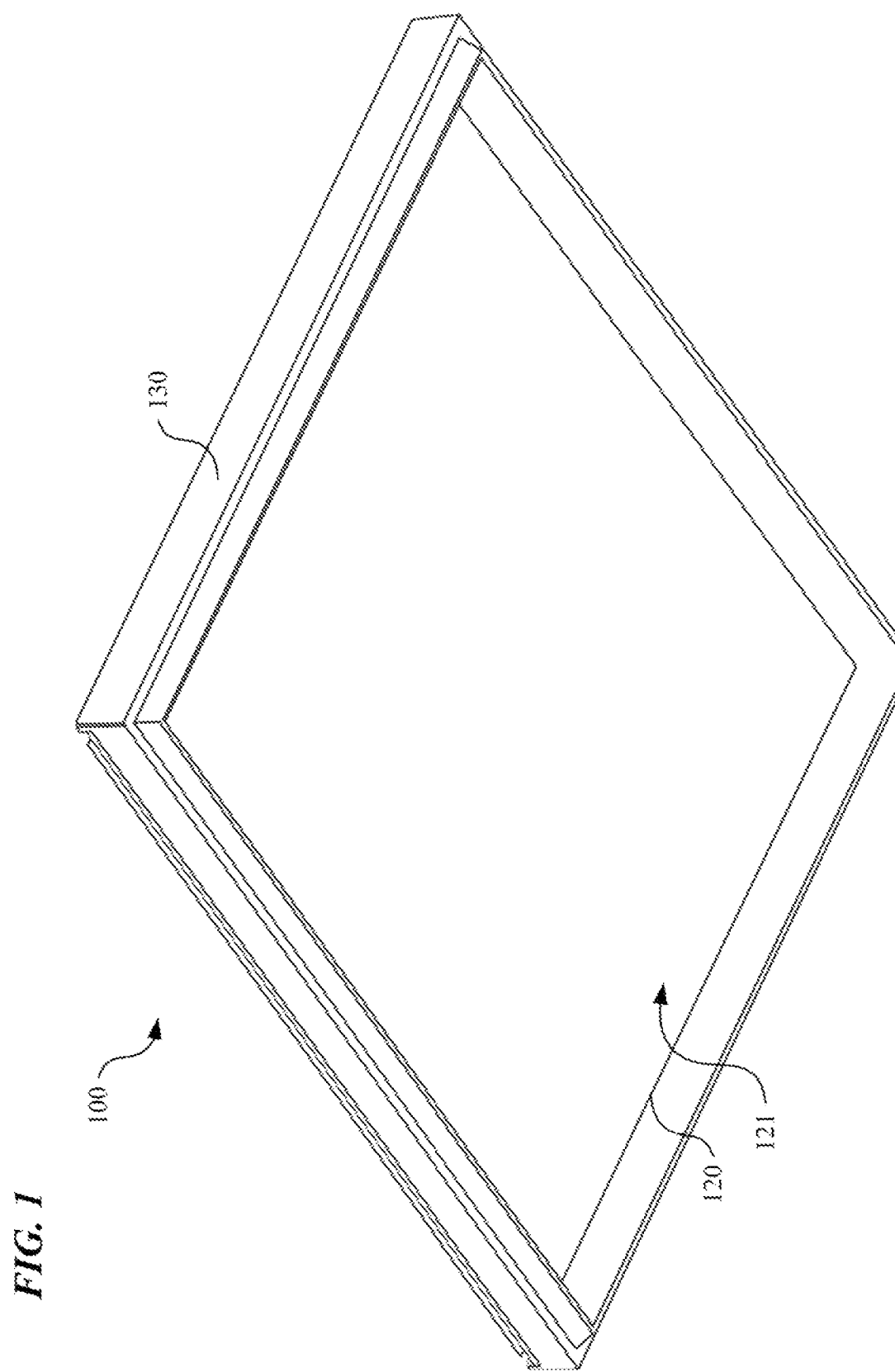
FIG. 1 is a perspective view (e.g. as if viewed from an area to be illuminated) of an example of a configurable lighting device.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

As lighting systems for general illumination become more sophisticated, variable, and tunable, some systems are incorporating an increasing number and/or density of lighting devices in a given area. In some examples, an entire ceiling of an area may be replaced by an array of contiguous lighting devices. The increase in number or density of lighting devices, as well as the use of contiguous lighting devices, results in the removal of other ceiling surfaces, such as conventional ceiling tiles, which previously performed some noise reduction function. Typical lighting devices in densely packed arrangements replace the exposed tiles with large, reflective surfaces which lack the noise reduction functionality of such ceiling tiles. Thus, these lighting systems may create an issue with increasing an amount of perceived or actual noise in an area under illumination.

The concepts disclosed herein improve over the art by providing lighting devices, particularly software configurable lighting devices offering both display and illumination functions, that serve the added function of reducing noise in the area illuminated by the lighting device. Noise reduction may be performed, for example, by redirecting, diffusing, dissipating, and/or absorbing incoming sound. The disclosed examples may be effective to reduce noise in an area immediately below the lighting device, or in an area within a predetermined distance of the lighting device. The disclosed examples may have a noise reduction coefficient (NRC) of at least 0.1, 0.2, 0.3, 0.4, 0.5, 0.6, 0.7, 0.8, or 0.9 at a desired frequency range or band, dependent on the size and configuration of noise reduction structures.

The detailed description below and the accompanying drawings disclose examples of lighting devices employing various types and configurations of noise reduction structures.

The lighting devices under consideration here may be applied to any indoor or outdoor region or space that requires at least some illumination, particularly where an associated display capability may be desirable.

The lighting equipment involved here may provide the main illumination component in the space, rather than ancillary light output as might be provided by a display, or by or in association with a sound system, or the like. Alternatively, lighting equipment involved here may provide the main illumination component together with a display functionality. In either case, the illumination from one or more of the fixtures, lamps, luminaires, daylighting equipment or other types of lighting devices is the main illumination that supports the purpose of the space, for example, the lighting that provides illumination sufficient to allow occupants in the space to perform the normally expected task or tasks associated with the planned usage of the space. Herein, such lighting is referred to as "general" lighting or "general" illumination.

The term "lighting device" as used herein is intended to encompass essentially any type of device that processes, generates, or supplies light, for example, for general illumination of a space intended for use of or occupancy or observation, typically by a living organism that can take advantage of or be affected in some desired manner by the light emitted from the device. However, a lighting device may provide light for use by automated equipment, such as sensors/monitors, robots, etc. that may occupy or observe the illuminated space, instead of or in addition to light provided for an organism. It is also possible that one or more lighting devices in or on a particular premises have other lighting purposes, such as signage for an entrance or to indicate an exit. Of course, the lighting devices may be configured for still other purposes, e.g. to benefit human or non-human organisms or to repel or even impair certain organisms or individuals. In most examples, the lighting device(s) illuminate a space or area of a premises to a level useful for a human in or passing through the space, e.g. regular illumination of a room or corridor in a building or of an outdoor space such as a street, sidewalk, parking lot or performance venue. The actual source of light in or supplying the light for a lighting device may be any type of light emitting, collecting or directing arrangement. The examples of configurable type lighting devices add a display capability. The typical systems using one or more such configurable lighting devices selectively configure the general illumination operations and the display operations, e.g. based on information such as light setting data and image data.

Light output from a lighting device, such as a software configurable lighting device, may carry information, such as a code (e.g. to identify the lighting device or its location) or downstream transmission of communication signaling and/or user data. The light based data transmission may involve modulation or otherwise adjusting parameters (e.g. intensity, color characteristic or distribution) of the illumination light output from the device and/or of the light of the displayed image.

The term "noise reduction structure" as used herein refers to any physical structure which formed and configured for the sole or primary purpose of passively reducing noise generating by incoming sound waves. Noise reduction structures may reduce noise, for example, by redirecting, diffusing, dissipating, and/or absorbing incoming sound.

Examples of noise reduction structures include surfaces which angle incoming sound waves in a direction away from the source of the sound wave, structures which lower sound intensity by diffusing sound waves to a larger area, openings which receive and/or confine sound waves, and structures that absorb and/or dissipate sound energy. While many structures and/or surfaces may inherently be capable of performing one or more of the recited functions to a limited extent, noise reduction structures of the present invention perform the function of reducing noise as their sole or primary purpose, e.g., are designed principally to perform a noise reduction function. The size, shape, number, and/or dimension of noise reduction structures described herein may be selected based on the desired degree of noise reduction in the area under illumination, and/or based on the desired frequency range or band of noise reduction.

It should be appreciated that noise reduction also may be provided by active noise reduction or cancellation technology, with sound pickup and acoustic output capability incorporated into the lighting device and associated processing circuitry included in the circuitry of the lighting system that includes the device or luminaire. Additional details of active noise solutions are disclosed in U.S. patent application Ser. No. 15/948,401, filed Apr. 9, 2018, entitled "ACTIVE SOUND CONTROL IN A LIGHTING SYSTEM," the entire contents of which are incorporated herein by reference.

The term "coupled" as used herein refers to any logical, physical, optical or electrical connection, link or the like by which forces, energy, signals or other actions produced by one system element are imparted to another "coupled" element. Unless described otherwise, coupled elements or devices are not necessarily directly connected to one another and may be separated by intermediate components, elements or communication media that may modify, manipulate or carry the signals. The "coupled" term may apply to either one or both of optical coupling and electrical coupling. For example, a light emitter or sensor may be optically coupled to a lens or the like, whereas a processor or the like may be coupled to control and/or exchange instructions or data with a light emitter or sensor or with other elements of a device or system via electrical connections, optical connections, electromagnetic communications, etc.

Reference now is made in detail to the examples illustrated in the accompanying drawings and discussed below.

FIG. 1 is a perspective view of an example of a software configurable lighting device 100, from a perspective as if viewed by a person in an area or a space to be illuminated by the lighting device 100. The configurable lighting device 100 includes a controllable general illumination device configured to output illumination light sufficient for general illumination of an area and a display configured to output light as a representation of an image into the area. The display is co-located with the general illumination device such that an available output region of the display towards the area at least substantially overlaps an available output region of the general illumination device towards the area. The general illumination device and the display may be supported by and at least partially contained within a housing 130, however, details of the components of general illumination device and the display are not readily visible in the first drawing. Examples of the general illumination device and the display are shown and described later.

The lighting device 100, in this example, includes a panel 120. The panel 120 may be an element of the display, for example, of a transparent OLED display (see e.g. U.S. patent application Ser. No. 15/095,192, filed Apr. 11, 2016, entitled "LUMINAIRE UTILIZING A TRANSPARENT ORGANIC LIGHT EMITTING DEVICE DISPLAY," the entire contents of which are incorporated herein by reference). Alternatively, the panel may be an element such as a waveguide of the general illumination device or a diffuser associated with the waveguide of such a device (see e.g. U.S. patent application Ser. No. 15/424,208, filed Feb. 3, 2017, entitled "LUMINAIRE AND LIGHTING SYSTEM, COMBINING TRANSPARENT LIGHTING DEVICE AND DISPLAY COUPLED TO OUTPUT IMAGE VIA THE TRANSPARENT LIGHTING DEVICE," the entire contents of which are incorporated herein by reference). In other examples, the panel may be a diffuser optically coupled to receive light outputs from of the general illumination device and the display. Additional more specific examples are cited later.

The configurable lighting device 100 has a light output surface 121 configured and located such that light output from the general illumination device and light output from the display propagate out via the light output surface 121. In the example of FIG. 1, the light output surface 121 is the surface of the panel 120 facing toward the area that receives combined light output from the configurable lighting device 100, in this example, including light output from the general illumination device and light output from the display.

The configurable lighting device 100 also has a noise reduction structure. A variety of examples of noise reduction structures are shown in FIGS. 3-15 and described in detail later with regard to those drawings. Not all of the examples of such a noise reduction structure would be readily visible in a perspective view like that of FIG. 1, therefore details of the noise reduction structure are omitted from FIG. 1 for ease of illustration.

The drawing shows the example configurable lighting device 100 as a relatively square structure when viewed from the illuminated area or from the back of the device 100, e.g. with a substantially square output surface 121. It should be apparent, however, that similar devices incorporating a general illumination device, a display and a noise reduction structure may have other shapes, e.g. a non-equilateral rectangle, a triangle, a polygon having five or more sides, a rounded polygon, curved shapes, etc.

Figure 2:
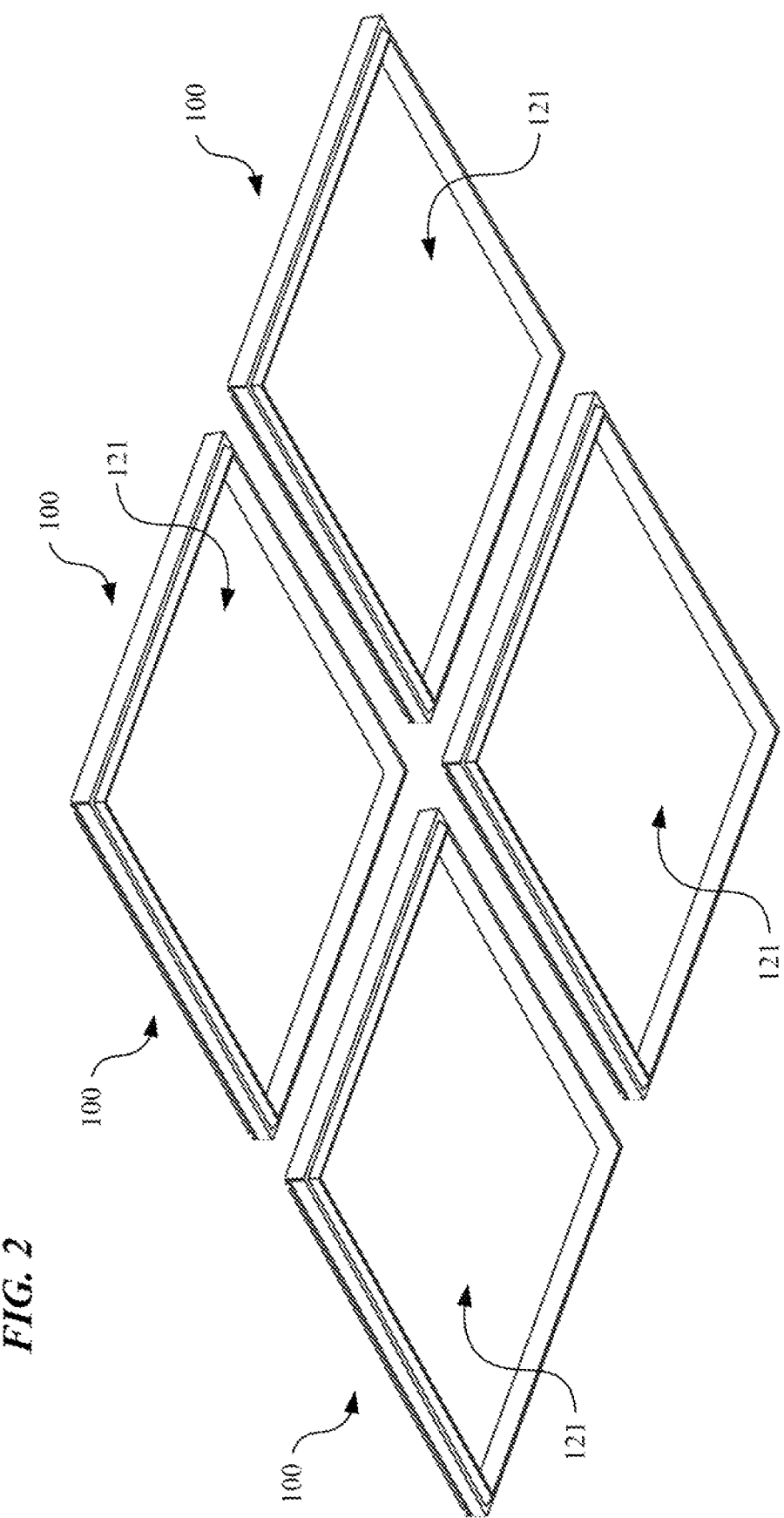
FIG. 2 is a perspective view of an array of configurable lighting devices like the device of FIG. 1, as may for example be mounted on or hung below a ceiling.

Any number of the configurable lighting devices 100 may be mounted close together on the wall or ceiling or at about the same distance above the floor, e.g. in an array or other modular design arrangement of devices of the same or different sizes or shapes. FIG. 2 is a perspective view of an array of lighting devices 100, for convenience, all similar to the device of FIG. 1, as may for example be mounted on or hung below a ceiling. Groups of the lighting devices 100 may be deployed to provide defined lighting and associated display capabilities in one or more desired parts of a larger space or across an entire ceiling. FIG. 2 shows a simple example of a possible layout of a four of the configurable lighting devices 100, although there may be just two or three of the configurable lighting devices 100. It should be apparent that any higher number of the lighting devices 100 can be mounted in proximity to each other as may be suitable to a particular lighting and display application and in an aesthetically desirable pattern.

The example shows relatively small spacings between adjacent configurable lighting devices 100, however, the devices may be mounted even closer or so that sides or edges of adjacent devices 100 abut. In such dense deployments, there is little or no exposed ceiling or wall area in between the adjacent configurable lighting devices 100, and thus little or not room for acoustic dampening materials, such as otherwise might be provided by exposed ceiling tiles or the like. As a result, the sound reflective surfaces of the software configurable lighting devices 100, such as a number of light output surfaces 121 together may produce unwanted echo or noise, particularly where other surfaces in the area such as the floor or walls also reflect acoustic waves. The noise reduction structures are incorporated as elements of the configurable lighting devices 100 to mitigate echo or other undesirable sound particularly as might otherwise be reflected within the area under illumination by the configurable lighting devices 100.

It may be helpful now to turn to examples of several noise reductions structures that may be incorporated in the configurable lighting devices 100.

Figure 3:
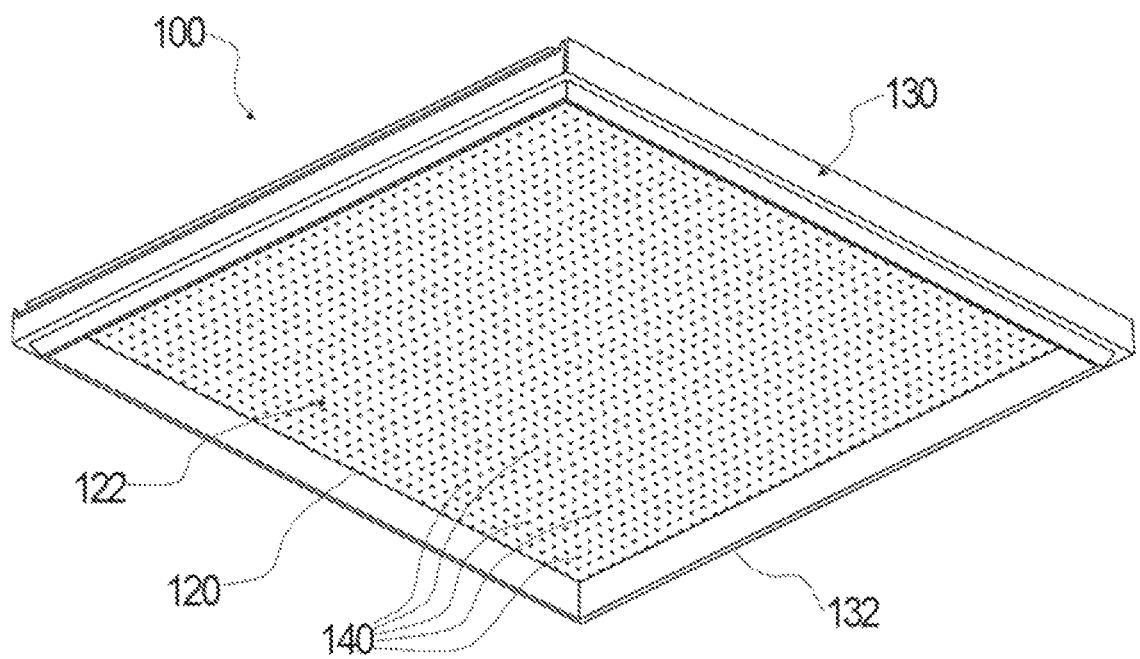
FIG. 3 is a perspective view of a configurable lighting device with a first type of noise reduction structure.
Figure 4:
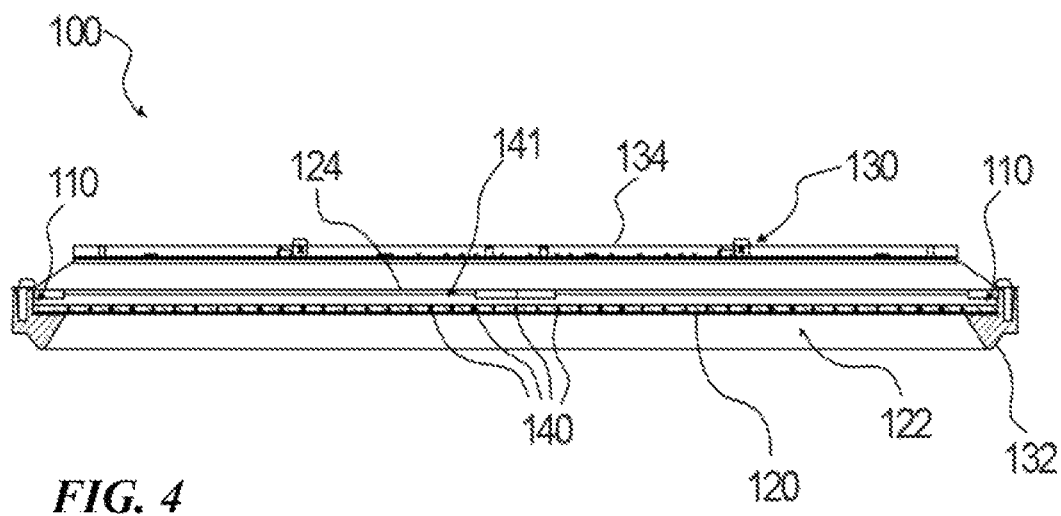
FIG. 4 is cross-sectional side view of an example of the lighting device of FIG. 2.

FIGS. 3 and 4 illustrate an example of a lighting device 100. As a general overview, lighting device 100 includes a light source 110, a panel 120, a housing 130, and at least one noise reduction structure. Additional details regarding lighting device 100 are set forth below.

Light source 110 is mounted within housing 130, and is configured to emit light to illuminate an area, e.g., an area below lighting device 100. Virtually any source of light may be used for light source 110. If lighting device 100 is a luminaire, light source 110 may be configured to emit light of intensity and other characteristics appropriate for artificial general illumination. A variety of suitable light generation sources are indicated below.

Suitable light generation sources for use as light source 110 include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used to implement the light source 110.

Light source 110 may include a single emitter to generate light, or may combine light from some number of emitters to generate the light. A lamp or 'light bulb' is an example of a single source; an array of LEDs is an example of multiple light emitters. An LED light engine may provide a single output for a single source but typically combines light from multiple LED type emitters within the single engine.

Panel 120 is supported by housing 130, and is configured to receive light from light source 110 at one or more light input surfaces of panel 120, and output the received light from light source 110 via one or more light output surfaces of panel 120 to the area to be illuminated by lighting device 100. Panel 120 may be formed from any desired material which allows the light from light source 110 to illuminate the area. For example, panel 120 may be formed from material which allows light from light source 110 to propagate within the material of panel 120 from the light input surface(s) to the light output surface(s). Panel 120 may be transparent, translucent, diffusive, or may filter light from light source 110.

Panel 120 defines a light output surface 122 facing the area under illumination. The light output surface 122 extends over at least a portion of lighting device 100. Where light output surface 122 is defined by a major surface of panel 120, light output surface 122 may cover all or substantially all of the area of lighting device 100. In some examples, the light output surface 122 has a planar shape, as shown in FIGS. 3 and 4. The light output surface 122 may have other shapes based on the arrangement of light source 110, the desired pattern of illumination provided by lighting device 100, or as further described herein.

In one example, panel 120 comprises a light guide which receives and guides light from light source 110 with minimal loss or absorption, as shown in FIGS. 3 and 4. The light guide has a major surface facing the area under illumination. The major surface is bounded by lateral edges, e.g., four edges for a rectilinear light guide. In this example, the major surface of the light guide defines a light output surface of the light guide, and the lateral edges of the light guide define light input surfaces of the light guide. Light source 110 is coupled to supply light to one or more of the lateral edges of the light guide, and the light guide is configured to allow light to propagate within the light guide and exit via the major surface of the light guide. The major surface of the light guide may thereby form the light output surface 122 of panel 120. In this example, panel 120 may be formed from any suitable waveguide material, such as glass, plastic, or acrylic.

In a further example, which may be combined with the light guide described above, panel 120 comprises an optical diffuser. The optical diffuser may be coupled to or integrally formed with the major surface of the light guide. The optical diffuser diffuses and softens light from light source 110. The optical diffuser may be formed from any suitable material for diffusing light, such as, for example, acrylic material.

The optical diffuser of this example may be positioned below the light guide, and thereby receive light exiting the light guide. The diffuser may receive the light from the light guide at one or more light input surfaces, and may further define the light output surface 122 on a surface of the diffuser facing the area under illumination. Alternatively, the optical diffuser may be provided between light source 110 and the light guide, to diffuse light prior to the light being received by the one or more input surfaces of the light guide.

In the above examples incorporating a light guide, lighting device 100 may further include a display 124 mounted within the housing at a location to supply image light to another light input surface of panel 120, e.g., a surface of the light guide substantially opposite the major surface. The image light from display 124 may then pass through the light guide and exit the light guide via the major surface of the light guide. Suitable displays for use in lighting device 100 are known.

Housing 130 is configured to house light source 110 and panel 120. Housing 130 may include, for example, a light socket for receiving and/or holding light source 110, and/or may include electrical connections for providing power and/or control signals to light source 110. Housing 130 may have any size suitable for accommodating the desired light source 110, and/or based on the desired illumination requirements or goals of lighting device 100. Housing 130 may further include a bracket, frame, mount, or other structure for receiving and holding panel 120. Housing 130 may house other components of lighting device 100, such as controllers, drivers, power sources, circuitry, and other known lighting device components.

In one example, housing 130 includes a bezel 132 and a casing 134, as shown in FIGS. 3 and 4. Bezel 132 surrounds and holds panel 120. Casing 134 is positioned overtop the internal components of lighting device 100. Suitable materials for forming bezel 132 and/or casing 134 include, for example, aluminum, steel, zinc, or plastic (for both), as well as sheet metal (for casing 134). Suitable processes for forming bezel 132 and/or casing 134 include, for example, machining, casting, or molding.

Housing 130 may define a housing surface facing the area under illumination. The housing surface may be provided on a portion of housing 130 which faces the area unobstructed, e.g. on bezel 132, or may be provided on a portion of housing 130 which faces the area through an obstruction, e.g., on a portion of casing 134 which is behind panel 120. It will be understood that in some embodiments, lighting device 100 may not include a bezel, and panel 120 may extend to the peripheral edges of lighting device 100. In such embodiments, the housing surface would be formed on a portion of the housing which is behind panel 120.

Noise reduction structure(s) may be formed on one or both of the light output surface and the housing surface. Noise reduction structures passively reduces noise in the area under illumination by lighting device 100. Noise reduction structures may be integrally formed with panel 120 or housing 130, or may be formed on separate materials which are affixed or adhered to panel 120 or housing 130.

The size, shape, number, and/or dimension of noise reduction structures described herein may be selected based on the desired degree of noise reduction in the area under illumination, and/or based on the desired frequency range or band of noise reduction. In one example, the noise reduction structures of lighting device 100 reduce noise in an area immediately below the lighting device, or in an area within a predetermined distance of the lighting device. The noise reduction structures may reduce a volume or intensity of noise in the area under illumination within a desired frequency range or band, and/or may reduce a predetermined amount of noise in the area under illumination.

A variety of non-limiting examples of noise reduction structures are described herein. It will be understood that any number of examples of noise reduction structures could be combined in a single lighting device 100.

Noise reduction structures may comprise openings formed in the light output surface or the housing surface. As shown in FIGS. 3 and 4, the openings may be holes (or perforations) 140 which are formed in a surface of panel 120. Holes 140 may be arranged in predetermined positions, e.g., as part of an array, or may be positioned randomly or pseudo-randomly. Holes 140 may have a size, shape, and depth specifically selected to promote diffusion, absorption, and/or dissipation of incoming sound waves. In one example, holes have a circular cross-section with a diameter of from 0.5 to 0.9 mm.

Holes 140 may extend partly through panel 120, or may extend all of the way through panel 120. In the latter example, holes 140 may be coupled with a cavity defined in the housing on a side of panel 120 opposite the area under illumination. As shown in FIG. 4, holes 140 may be in communication with a cavity 141 defined between panel 120 and light source 110. Cavity 141 may have a depth of from 1 to 2 mm. Coupling holes 140 to cavity 141 may further promote noise reduction by creating a larger volume within housing 130 for receiving and dissipating sound energy.

In a particular example, holes 140 and cavity 141 may be configured to act as a Helmholtz resonator. A Helmholtz resonator or Helmholtz oscillator is a container of gas (usually air) with an open hole (or neck or port). A Helmholtz resonator is created when air resonates in a cavity, for example, due to air blown over the top of a bottle/cavity. The air in the neck or opening has a discrete mass, the air in the cavity will act like a spring. During oscillation, the gas in the cavity is alternately compressed and expanded at very low magnitudes. The inertia of the air in the neck/opening plays an important role. The resonant frequency is controlled by length of the neck/opening, cross-sectional area of the neck/opening, and the volume of the cavity. The design of a Helmholtz resonator can be done by trial and error, e.g. using variable size necks/openings and cavities, or by using a fluid dynamic program. The resonant frequency of a Helmholtz resonator may be proportional to the speed of sound and the square root of the cross section of the neck or opening, divided by the product of the cavity volume and neck length. In this example, when receiving incoming sound waves, a volume of air in cavity 141 and near the open hole(s) 140 may vibrate due to the 'springiness' of the air inside cavity 141. The size of holes 140 and cavity 141 may be selected based on the desired frequency of sound to be trapped within the Helmholtz resonator.

Figure 5:
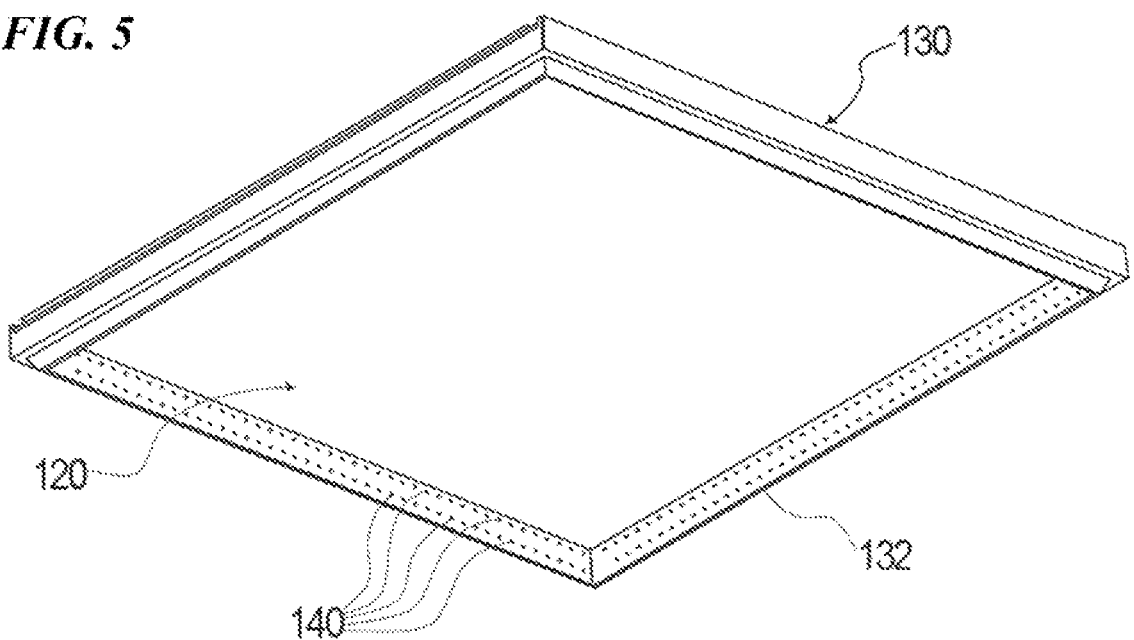
FIG. 5 is a perspective view of a configurable lighting device with another example of a noise reduction structure.

As shown in FIG. 5, the openings may be holes 140 which are formed in a surface of bezel 132. Holes 140 may have any of the features set forth above. Holes 140 may be arranged in predetermined positions, e.g., as part of an array, or may be positioned randomly or pseudo-randomly. Holes 140 may have a size, shape, and depth specifically selected to promote diffusion, absorption, and/or dissipation of incoming sound waves. Holes 140 may extend partly through bezel 132, or may extend all of the way through bezel 132, and in such examples, may be coupled with a cavity positioned behind the housing surface.

Figure 6:
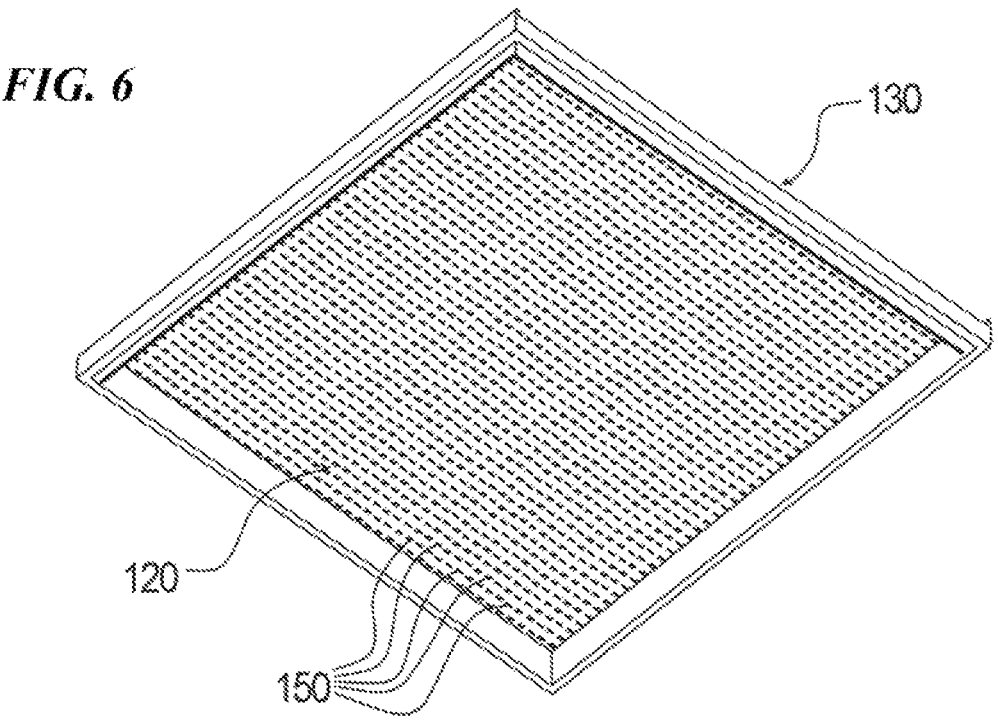
FIG. 6 is a perspective view of a configurable lighting device with another example of a noise reduction structure.

As shown in FIG. 6, the openings may be slots 150 formed in a surface of panel 120. Slots 150 are arranged in a parallel fashion covering the light output surface. Slots 150 may be arranged with predetermined spacing, or may be positioned randomly or pseudo-randomly. Slots 150 may have a size, shape, and depth specifically selected to promote diffusion, absorption, and/or dissipation of incoming sound waves. In one example, slots 150 may have a width corresponding to a positive integer multiple of half a wavelength of the noise to be damped. In a particular example, slots 150 may be configured as a Helmholtz resonator, as described above.

Figure 7:
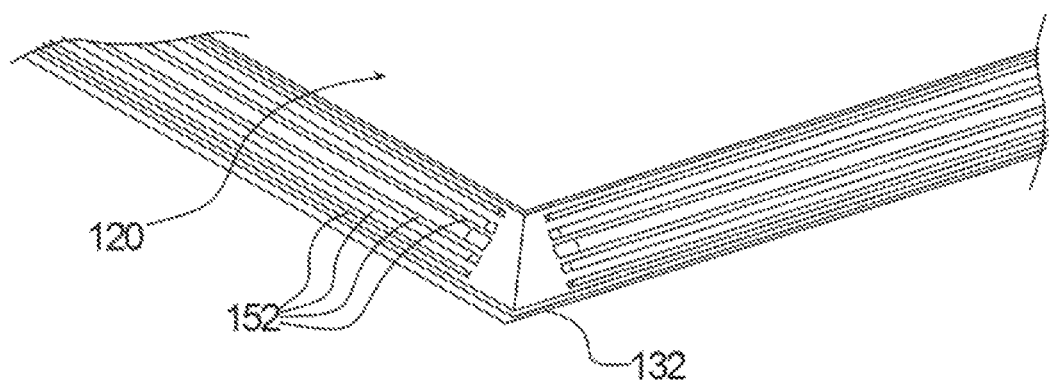
FIGS. 7 and 8 are views of another example of a noise reduction structure on a configurable lighting device.
Figure 8:
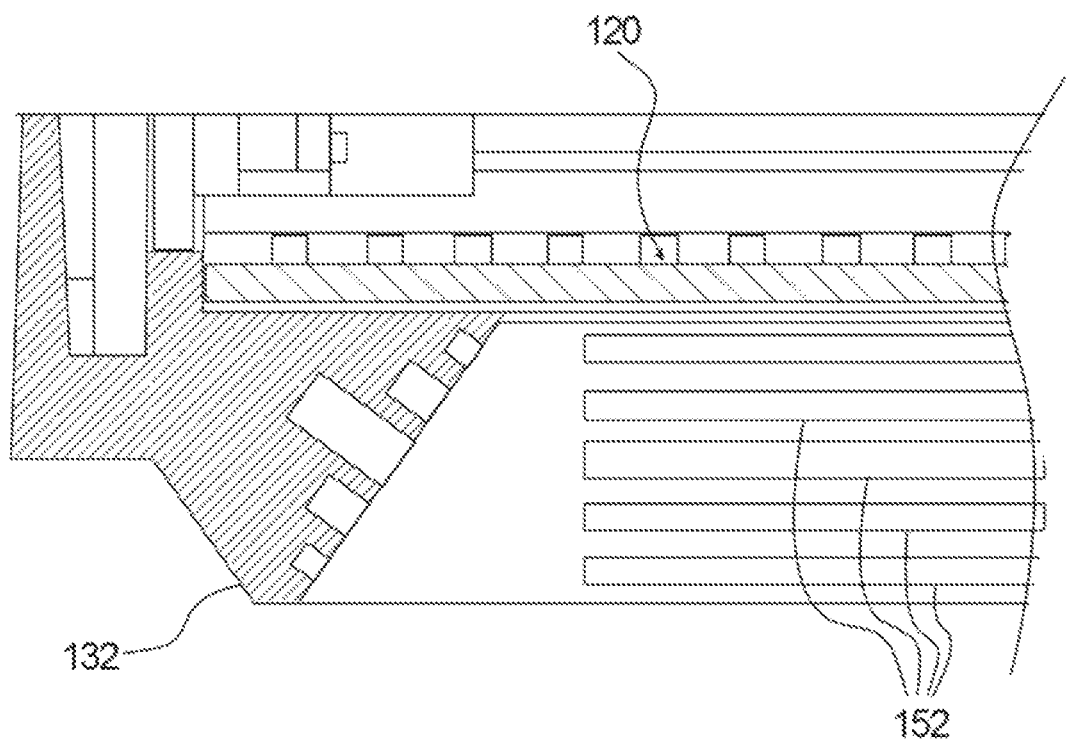

As shown in FIGS. 7 and 8, the openings may be channels 152 formed in a surface of bezel 132. Channels 152 are arranged in a parallel fashion along the surface of bezel 132. Channels 152 may be arranged with predetermined spacing, or may be positioned randomly or pseudo-randomly. Channels 152 may have a size, shape, and depth specifically selected to promote diffusion, absorption, and/or dissipation of incoming sound waves. In one example, channels 152 may have a width corresponding to a positive integer multiple of half a wavelength of the noise to be damped.

Figure 9:
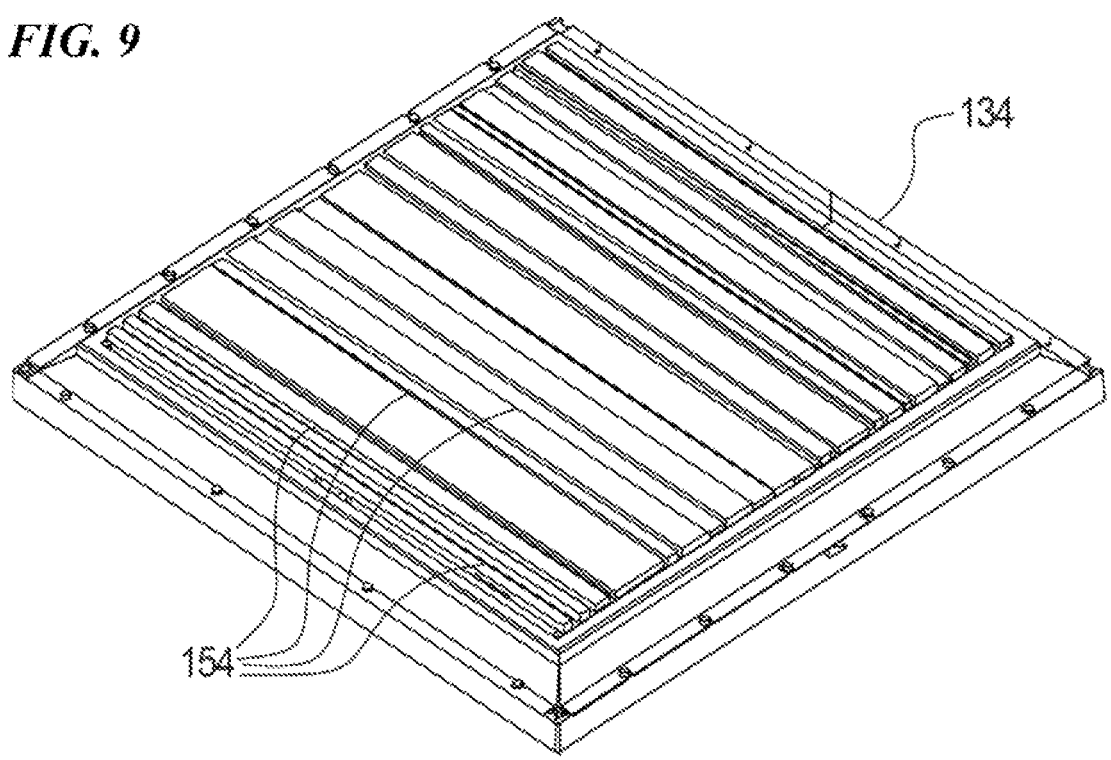
FIGS. 9 and 10 are views of another example of a noise reduction structure on a configurable lighting device.
Figure 10:
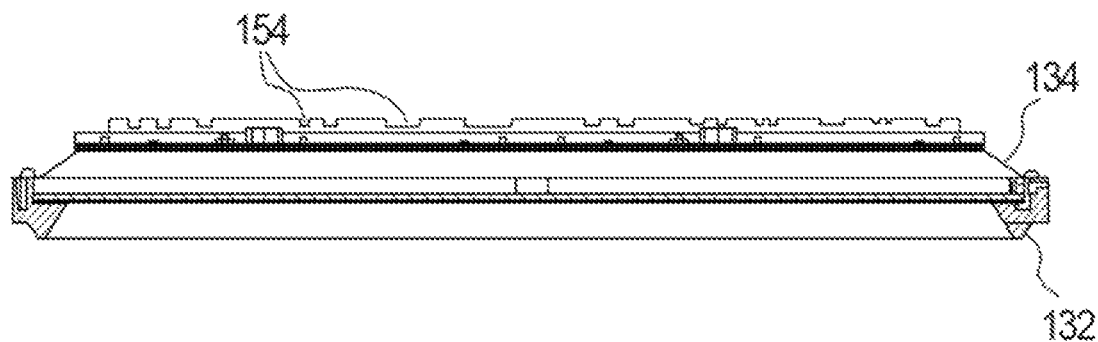

As shown in FIGS. 9 and 10, the openings may be channels 154 formed in a surface of casing 134. Channels 154 are arranged in a parallel fashion cover the surface of casing 134. Channels 154 may have any of the features set forth above with respect to channels 152. Channels 154 may be arranged with predetermined spacing, or may be positioned randomly or pseudo-randomly. Channels 154 may have a size, shape, and depth specifically selected to promote diffusion, absorption, and/or dissipation of incoming sound waves. In one example, channels 154 may have a width corresponding to a positive integer multiple of half a wavelength of the noise to be damped.

Figure 11:
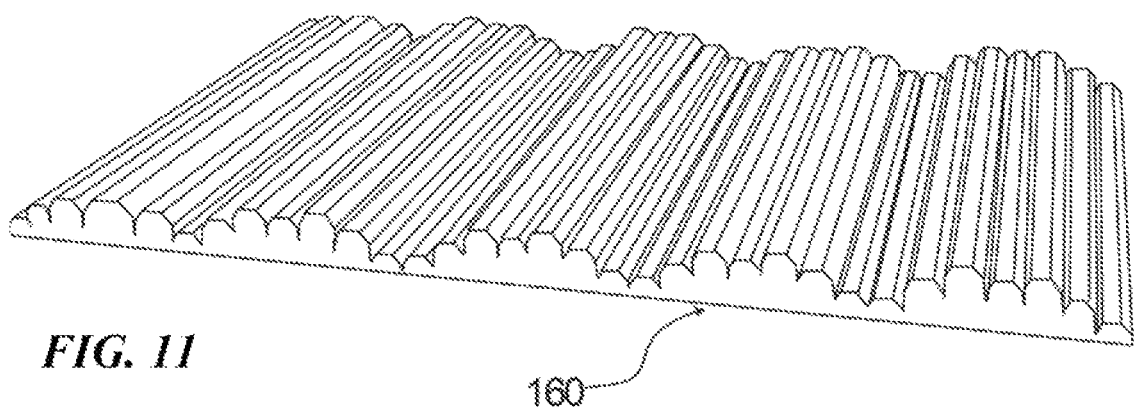
FIG. 11 is a view of another example of a noise reduction structure.
Figure 12:
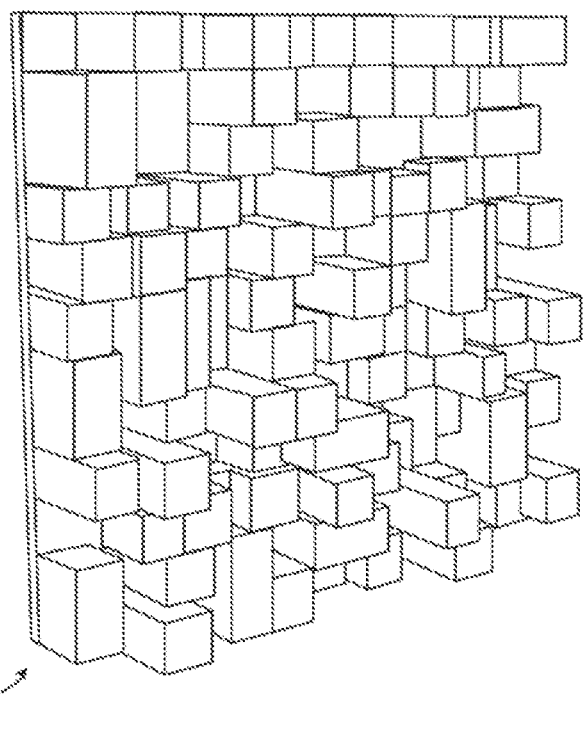
FIG. 12 is a view of another example of a noise reduction structure.

In addition to openings in the light output surface or housing surface, noise reduction structures may comprise projections in the light output surface and/or housing surface, or combinations of openings or projections in the light output surface and/or housing surface. Similarly to the holes, the projections may have a size, shape, and height specifically selected to promote diffusion, absorption, and/or dissipation of incoming sound waves. In one example, an array of projections may be provided, e.g., in order to form an acoustic frequency absorber. In other examples, the projections may form an acoustic diffuser, such as a Schroeder. The noise reduction structure may be provided as a one-dimensional acoustic diffuser 160, as shown in FIG. 11, or as a two-dimensional acoustic diffuser 162, as shown in FIG. 12. The design and formation of a suitable acoustic diffuser or frequency absorber will be understood to those of ordinary skill in the art.

Acoustic diffusers interrupt discrete echoes by scattering or diffusing sound energy over a wide area without removing it from the room, rather than eliminating the sound reflections, as a frequency absorber would. This may maintain sound clarity and improves speech intelligibility. The width of the strips of a diffuser may be smaller than or equal to half the wavelength of the frequency of sound where the maximum scattering effect is desired. Ideally, small vertical walls are placed between lower strips, improving the scattering effect in the case of tangential sound incidence. The bandwidth of these devices may practically be limited to within approximately one octave of the designed frequency of diffusion; at one octave above the design frequency, the diffusor efficiency may drop to close to that of a flat surface.

A quadratic diffuser (as shown in FIG. 12) may comprise a series of wells or troughs that are of different depths. The width of the wells of the diffuser may be smaller than or equal to half the wavelength of the frequency of sound where the maximum scattering effect is desired, whereas the depth of the wells may be a positive integer multiple of a quarter of the wavelength of the frequency of sound where the maximum scattering effect is desired. A series of different depths can be calculated and designed to diffuse frequencies from 100 Hz. up though 4,000 Hz, for example, or even higher. In one example, a series of well depths for a quadratic diffuser may be based upon prime numbers. The prime number chosen is used to produce a series of numbers that correspond to the different well or trough depths. The larger the prime number, the more frequencies that are built into the sequence, resulting in a larger unit which diffuses more frequencies.

Figure 13:
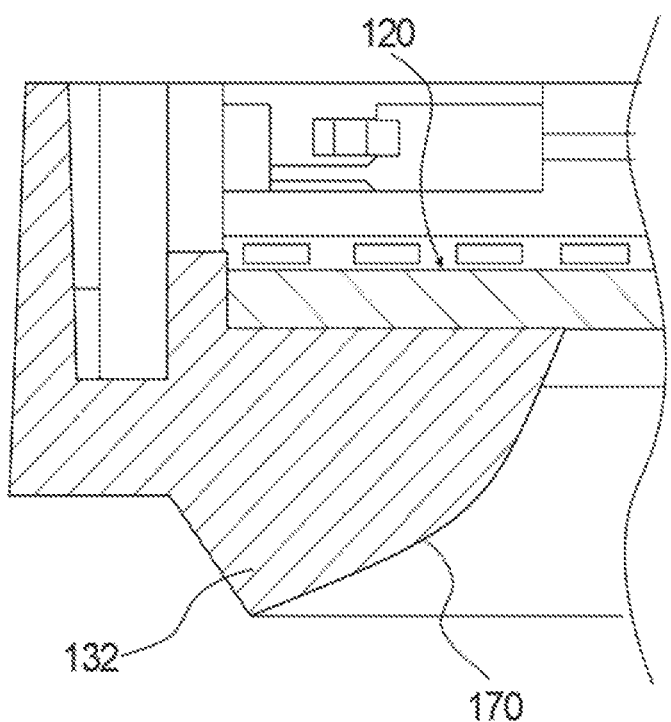
FIG. 13 is a view of another example of a noise reduction structure on a configurable lighting device.

Additionally, the shape of the light output surface and/or housing surface itself may form the noise reduction structure. As shown in FIG. 13, the noise reduction structure may be a convex, curved surface 170 of bezel 132. This convex surface may be configured to reflect incoming sound waves in directions away from the source of the sound wave, thereby reducing noise in the area.

Additional examples of noise reduction structures for use in the disclosed examples may be found, for example, in U.S. Pat. No. 7,677,359, issued Mar. 16, 2010, entitled "Sound absorbent," the contents of which are incorporated herein by reference in their entirety and for all purposes.

Figure 14:
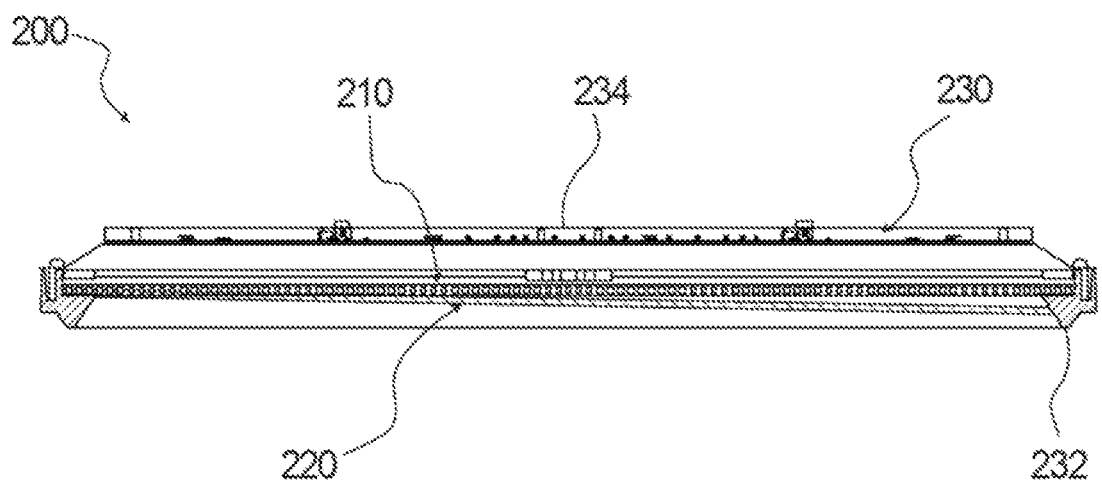
FIG. 14 is cross-sectional side view of another example of a configurable lighting device with noise reduction.

FIG. 14 illustrates another example of a lighting device 200. As a general overview, lighting device 200 includes a light source 210, a panel 220, a housing 230, and at least one noise reduction structure. Additional details regarding lighting device 200 are set forth below.

Light source 210 is configured to emit light to illuminate an area, e.g., an area below lighting device 200. Light source 210 may be any light source described above with respect to light source 110.

Panel 220 is positioned between light source 210 and the area to be illuminated by lighting device 200. Panel 220 may be formed from any material described above with respect to panel 120. Panel 220 defines a planar light output surface facing the area under illumination, as shown in FIG. 14.

Housing 230 is configured to house light source 210 and panel 220. Housing may have any structure described above with respect to housing 130, and may house any of the components set forth above with respect to housing 130. Housing 230 includes a bezel 232 and a casing 234, as shown in FIG. 14. Bezel 232 surrounds and holds panel 220. Casing 234 is positioned overtop the internal components of lighting device 200.

Bezel 232 defines a bezel surface facing the area under illumination. The bezel surface defines a plane, and may be configured to be parallel to the surface in which lighting device 200 is mounted, e.g., the bezel surface may be parallel to the ceiling of the area under illumination.

In lighting device 200, the noise reduction structure is formed by panel 220. Panel 220 performs noise reduction by redirecting sounds away from the area under illumination. In particular, the planar surface of panel 220 is oriented at an angle relative to the plane defined by the bezel surface. The angle of panel 220 may be selected so as to reduce noise without interfering with the illumination provided by light source 210. The angle of panel 220 may be selected so as to not be visually noticeable to a person in the area under illumination. In one example, the angle of the surface of panel 220 relative to the surface of bezel 232 may be an oblique angle, e.g., in the range of one to four degrees.

Figure 15:
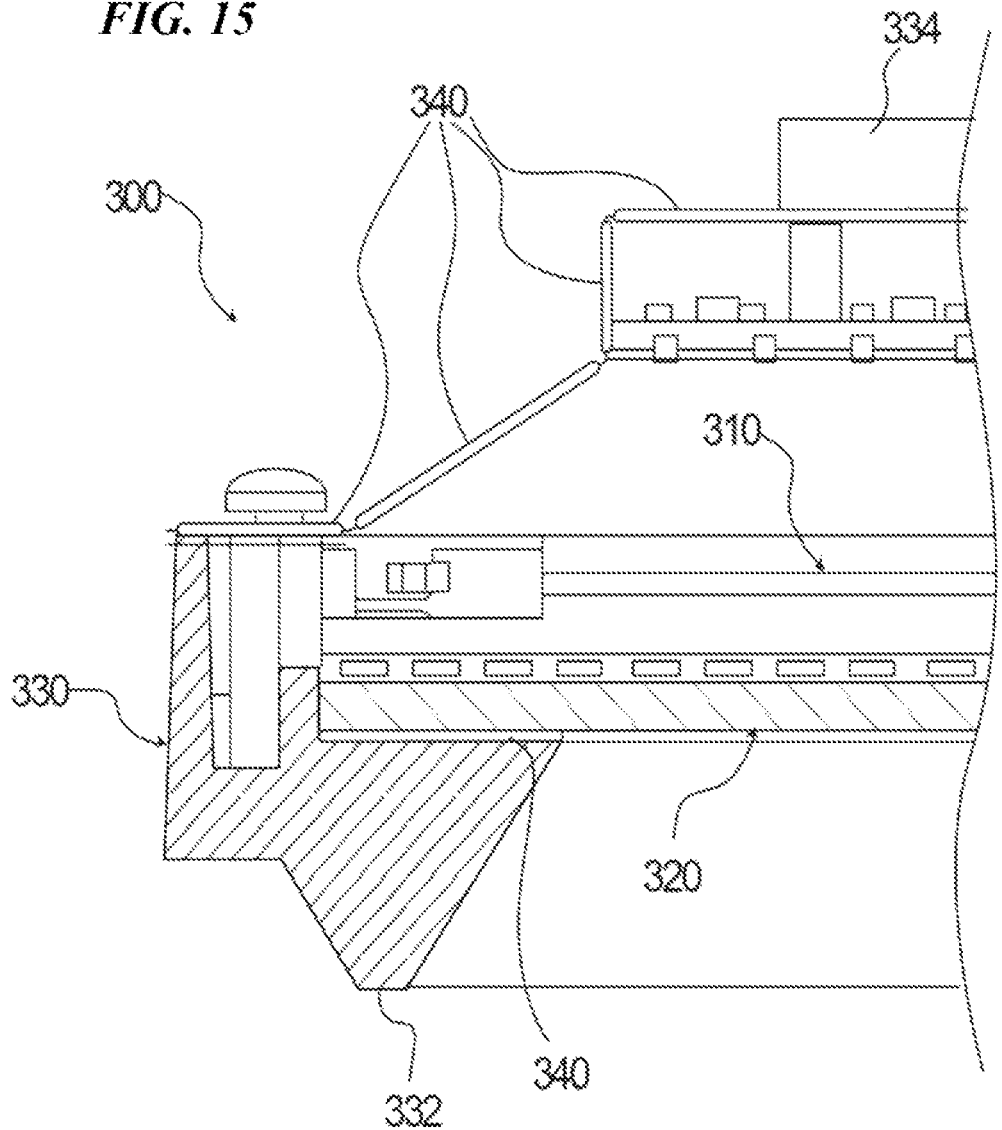
FIG. 15 is cross-sectional side view of yet another example of a configurable lighting device.

FIG. 15 illustrates another example of a lighting device 300. As a general overview, lighting device 300 includes a light source 310, a panel 320, a housing 330, and at least one noise reduction structure. Additional details regarding lighting device 300 are set forth below.

Light source 310 is configured to emit light to illuminate an area, e.g., an area below lighting device 300. Light source 310 may be any light source described above with respect to light source 110.

Panel 320 is positioned between light source 210 and the area to be illuminated by lighting device 200. Panel 320 may be formed from any material described above with respect to panel 120.

Housing 330 is configured to house light source 310 and panel 320. Housing may have any structure described above with respect to housing 130, and may house any of the components set forth above with respect to housing 130. Housing 330 includes a bezel 332 and a casing 334, as shown in FIG. 15. Bezel 332 surrounds and holds panel 320. Casing 334 is positioned overtop the internal components of lighting device 300.

In light device 300, noise reduction structures are noise damping structures 340 which are provided between the components of lighting device 300. Noise damping structures 340 passively reduce noise in the area under illumination by absorbing and dissipating the energy from sound waves which impact lighting device 300, in order to dampen the transmission of vibrations between the components of lighting device 300.

Noise damping structures 340 may be layers of material provided, for example, between panel 320 and housing 330, and/or between bezel 332 and casing 334. Noise damping structures 340 may be provided between any other components for which it would be desirable to reduce or minimize the transmission of vibrations. Noise damping structures 340 are not limited to being provided between components, but also may be coupled to the surface of components, such as housing 330, as shown in FIG. 15. Suitable materials for forming noise damping structures 340 will be known, and may include elastomeric materials such as vinyl materials, polymer materials, and foams, as well as fibrous materials such as mineral wool, wool, cotton fibers, wood fibers, or synthetic fibers, or asphalt materials, for example.

In a system having multiple fixtures (e.g. like described relative to FIG. 2), all of the fixtures may use the same type of noise reduction structure ala any of the examples described relative to FIGS. 3 to 15. Alternatively, the fixtures may use similar structures but with a different characteristic (e.g. differently angled diffusers), or different fixtures may use different types of the disclosed noise reduction structures. For example, where using noise reduction structures of specific sizes, e.g. slots, the different fixtures may use different sized slots to have different effective frequencies. In another example, Helmholtz diffusers in different fixtures may be tuned for different acoustic frequencies. Where the diffusers are angled, they may be angled in different directions in different ones of the fixtures or such diffusers may be at different size angles in different fixtures. As another example, some fixtures may have angled diffusers, while other fixtures in the group may have slots in the diffuser and/or slots in the bezel.

Lighting devices 100, 200, 300 may be used as standalone lighting devices (see e.g. FIG. 1) or as part of a system of lighting devices (see e.g. FIG. 2). In one example, a system of lighting devices is provided with each lighting device including the components described above for lighting device 100, 200, and/or 300. It will be understood that such a system could include any number of lighting devices as desired to adequately illuminate the region in which the system is located and/or to provide a desired display capability. In such a system, the lighting devices may cooperate to reduce noise in an entire region under illumination.

The light devices under consideration may be implemented using a variety of general illumination devices, a variety of displays and/or a number of different relative arrangements of a general illumination device relative to a display in each particular lighting device implementation. Examples of the general illumination and display component and arrangements thereof to form configurable lighting devices analogous to device 100 are discussed below with regard to FIGS. 16 to 19.

Figure 16:
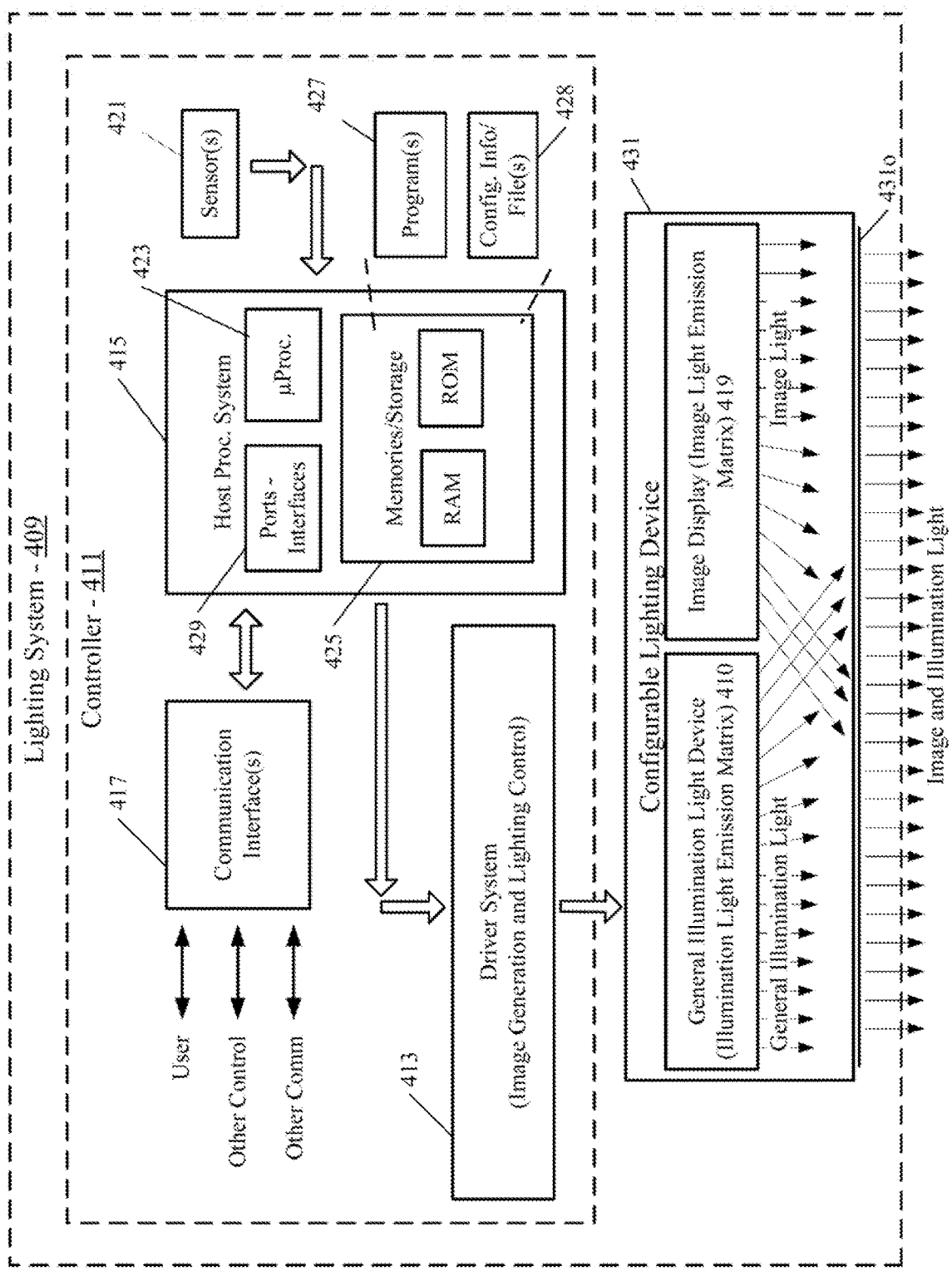
FIG. 16 is a high level functional block diagram of a lighting device that includes a luminaire that may support concurrent display image light output and illumination light output, and may incorporate noise reduction.

FIG. 16 illustrates an example of a configurable lighting device 431, e.g. where the light source, display and output surface of the lighting device 431 are elements of a configurable lighting system 409 that also includes a controller 411. In the simplified block diagram example, the configurable lighting device 431 includes a controllable general illumination device 410, which includes a light emission matrix. The general illumination device 410 is configured to output illumination light from that light emission matrix via the output 431o of the lighting device 431. The configurable lighting device 431 also includes a display 419, which includes a light emission matrix configured to output light from selected areas of that light emission matrix, through the luminaire output 431o, as a representation of an image. Display 419 is an emissive type display device controllable to emit light of a selected image, e.g. as a still image or image frames of a video. In most examples, the configurable lighting device 431 includes two relatively separate and distinct emission matrices, although there may be additional emission matrices, or the emission matrices functionalities thereof may be combined into one physical matrix of suitable emitters. In the example with two physical matrices, for the general illumination light source and the display, the matrices are co-located such that an available output region of the illumination light emission matrix at least substantially overlaps an available output region of the display light emission matrix, as generally represented by overlapping emission arrows from the general illumination device 410 and the display 419 and by the arrows for combined light output from the luminaire output 431o. Where the emission matrices functionalities thereof are combined into one physical matrix of suitable emitters, the overlap of the output region of the illumination light emission matrix with output region of the display light emission matrix is substantially complete (e.g. so that the output regions of the illumination light device 410 and the display 419 as substantially coextensive at the light output surface 413o of the configurable lighting device 431).

The light output surface 413o of the configurable lighting device 431 corresponds to the light output surface 121 of the configurable lighting device 100 and other light output surfaces in the examples of FIGS. 1 to 15. The structural configuration of the configurable lighting device 431 may be similar to structures in the earlier drawings; and although not visible in the electrical block diagrams, the configurable lighting device 431 will include one or more of the noise reduction structures discussed above with regard to the examples of FIGS. 3 to 15.

The display 419 may be either a commercial-off-the-shelf image display type device or an enhanced display or the like specifically adapted for use in the configurable lighting device 431. The image display 419 is configured to output light to present an image. The presented image may be a real scene, a computer generated scene, a single color, a collage of colors, a video stream, animation or the like. The emission matrix of the illumination device 410 may be an otherwise standard general illumination system, of multiple individually controllable emitters. Several examples of the configurable lighting device 431 in which the lighting device and/or the display are specifically configured for use together in a luminaire are discussed later.

The general illumination light from general illumination device 410 alone or in combination with light output from the display 419 illuminates a space, for example, and may comply with governmental building codes and/or industry lighting standards. The illumination device 410 may have a maximum light generation capability at least at an intensity of 200 lumens. For general lighting examples, lumen outputs of the configurable lighting device 431 may range from 200 to 1600 lumens for typical office or residential applications. Higher lumen outputs may be desirable for commercial or industrial general illumination. These represent examples only of possible maximum output intensities for general illumination, and the general illumination device 410 is controllable to provide lower intensity outputs, e.g. for dimming.

The emission matrix of the general illumination device 410 will have sufficient emitters (e.g. of number and lumen output capabilities) to achieve levels of expected lumen output levels corresponding to specified intensity settings with some of the emitters of that matrix OFF or operating at low intensity. In that sense, for concurrent operation of both the display 410 and the illumination device 410, the emission matrix of the illumination device 410 will have some excess capacity. For higher intensity settings, the configurable lighting device 431 may run an illumination only mode, in which with all of the emitters of the emission matrix of the general illumination device 410 operate. In that mode, some or all of the emitters of the emission matrix of the display 419 may concurrently operate in a non-display mode, e.g. white output only to further increase the output intensity of light from the luminaire output 431o or selected color/intensity to tune the color of the light from the luminaire output 431o by mixing with light from the general illumination device 410.

The configurable lighting system 409 also includes a driver system 413 coupled to control light outputs generated by the first and second light emission matrices in the general illumination device 410 and the display 419. Although the driver system 409 may be separately located, in the example, the driver system 413 is implemented as an element of the controller 411. The driver system 413 may be implemented as an integrated driver circuit, although in many cases, the system 413 will include two separate driver circuits, one specifically adapted to provide suitable drive signals to the emitters of the particular implementation of the emission matrix of the general illumination device 410 and another specifically adapted to provide suitable drive signals to the emitters of the emission matrix of the display 419. Although active-matrix driver circuitry may be used in the driver system 413, to drive one or both of the emission matrices, driver circuitry may, passive matrix driver circuitry may be used. For example, a passive matrix driver circuit may be a more cost effective solution to drive one or both of the emission matrices, particularly for any emission matrix that need not be dynamically controlled at a fast refresh rate. An issue with passive matrix is that the brightness scales with the number of rows in the emission matrix. It may be acceptable for a display but may not be acceptable for general illumination light source. Both active matrix and passive matrix can independently control pixel outputs, and thus they are the two main methods to create images for display. Either of these two methods may be used for driver circuity for the image display 419. For a driver circuit for the emission matrix of the general illumination device 410, active matrix or passive matrix driving methods may not be required. For example, is some configurations of the general illumination device 410, general illumination light emitters are arranged together in a group forming a controllable row or a controllable column. Driving such a matrix then involves controlling a series of lighting emitters together instead of one emitter at each row and column intersection. In this later case, conventional pulse-width modulation driving circuity can tune the light intensity for a series of illumination lighting "pixels." This driving method is more energy efficient and more cost effective than current implementations of active matrix or passive matrix. In any event, the controllable configurable lighting device 431 provides general illumination light output from the device 410 in response to lighting control signals received from the driver system 413. Similarly, the controllable configurable lighting device 431 provides image light output from the display 419 in response to image control signals received from the driver system 413.

As shown in FIG. 16, the controller 411 also includes a host processor system 415 coupled to control operation of the driver system 413, and through the driver system 413 to control illumination and image light output from the configurable lighting device 431. The controller 411 may also include one or more communication interfaces 417 and/or one or more sensors 421. Other circuitry may be used in place of the processor based host system 415 (e.g. a purpose built logic circuit or an ASIC). In the illustrated example, the driver system 413 together with higher layer control elements of the device, such as the host processor system 415, serve as means for controlling the one or more matrices of light emitters. With advances in circuit design, driver circuitry could be incorporated together with circuitry of the host processor system.

FIG. 16 also provides an example of an implementation of the high layer logic and communications elements to control luminaire operations. As shown in FIG. 16, the example 411 of the controller includes the host processor system 415, one or more sensors 421 and one or more communication interface(s) 417. Other implementations of the circuitry of the controller 411 may be utilized.

The circuitry of the controller 411 may be configured to operate the general illumination light source 410 to generate the illumination light at least during an illumination state of the configurable lighting device 431, and to operate the display 419 to emit the light of the image at least during an image display state of the configurable lighting device 431. The circuitry of the controller 411 also may be configured to operate the general illumination light source 410 to generate the illumination light and the display 419 in one or more states in which the configurable lighting device 431 produces both types of light concurrently for simultaneous output at 431o.

In the example of FIG. 16, the host processor system 415 provides the high level logic or "brain" of the controller 411 and thus of the configurable lighting system 409. In the example, the host processor system 415 includes memories/storage 425, such as a random access memory and/or a read-only memory, as well as programs 427 stored in one or more of the memories/storage 425. The programming 427, in one example, configures the configurable lighting system 409 to implement display and illumination via the controlled configurable lighting device 431, as outlined above. If supported, the programming may also configure the lighting system 409 to implement active noise reduction.

At a high level, the host processor system 415 is configured to operate the general illumination device 410 and the display 419 via the driver system 413 to implement functions, including illumination and image output functions. For example, the first light emission matrix is operated so that the display 419 outputs the light of the image via an output 431o of the configurable lighting device 431. More specifically, the host processor system 415 controls operation of the configurable lighting device 431 based on image data and a general illumination light setting data, which may be stored in memory 425 in the controller 411 or received as streaming data for temporary storage (buffering in local memory). Operation also is controlled, based on programming of the host processor system 415 and/or appropriate illumination source control data.

Hence, the memories/storage 425 may also store various data, including luminaire configuration information 428 or one or more configuration files containing such information (e.g. an image or video, illumination setting data, communication configuration or other provisioning data, or the like) in addition to the illustrated programming 427. Light source control data may be generated or adjusted programmatically. Thus, programming or control data used by the host processing system 415 to implement control of operation of a general illumination device 410 of the configurable lighting device 431 when outputting general illumination light responsive to a received or stored setting while a display 419 of the configurable lighting device 431 is concurrently outputting light of an image based on received or stored image data.

The host processor system 415 includes a central processing unit (CPU), shown by way of example as a microprocessor (μP) 423, although other processor hardware may serve as the CPU. The CPU and memories, for example, may be implemented by a suitable system-on-a-chip often referred to as a micro-control unit (MCU). In a microprocessor implementation, the microprocessor may be based on any known or available microprocessor architecture, such as a Reduced Instruction Set Computing (RISC) using ARM architecture, as commonly used today in mobile devices and other portable electronic devices. Of course, other microprocessor circuitry may be used to form the processor 423 of the controller 411. The processor 423 may include one or more cores. Although the illustrated example includes only one microprocessor 423, for convenience, a controller 411 may use a multi-processor architecture with one or more additional microprocessors or associated processors of other types (e.g. a video or image processor, a math co-processor or arithmetic logic unit, etc.).

The ports and/or interfaces 429 couple the processor 423 to various elements of the configurable lighting system 409 logically outside the host processor system 415, such as the driver system 413, the communication interface(s) 417 and the sensor(s) 421. For example, the processor 423 by accessing programming 427 in the memory 425 controls operation of the driver system 413 and thus operations of the configurable lighting device 431 via one or more of the ports and/or interfaces 429. In a similar fashion, one or more of the ports and/or interfaces 429 enable the processor 423 of the host processor system 415 to use and communicate externally via the interface(s) 417; and one or more of the ports 429 enable the processor 423 of the host processor system 415 to receive data regarding any condition detected by a sensor 421, for further processing.

In the operational examples, based on its programming 427, the processor 423 processes data retrieved from the memory 423 and/or other data storage, and responds to illumination setting parameters in the retrieved configuration data 428 to control the light generation by the general illumination device 410. The light output control also may be responsive to sensor data from a sensor 426 and/or inputs via a user interface. The light output parameters may include either one or both of light intensity and light color characteristics of the light from general illumination device 410, either for overall light generated by the general illumination device 410 or a sub-groups of one or more emitters, among the matrix of emitters of the general illumination device 410. The illumination light setting parameters may also control modulation of the light output, e.g. to carry information on the illumination light output of the configurable lighting device 431 and/or to spatially modulate illumination light output distribution (if the configurable lighting device 431 includes an optical modulator, not shown). The configuration file(s) 428 may also provide the image data, which the host processor system 415 uses to control the display driver and thus the light emission from the image display 419.

The configurable lighting system 409 is capable of controlling operation of the general illumination device 410 so that the light output of the configurable lighting device 431 satisfies a determined operating parameter, e.g. a parameter included in setting data and/or specified by user input. In some cases, the configurable lighting system 409 operates all of the emitters of the first emission matrix of the display 419, for example, to output light of the image through all of the area of the luminaire output 431o. In other cases, the configurable lighting system 409 operates a selected number but not all of the emitters of the first emission matrix of the display 419, for example, to output light of the image through some but not all of the area of the luminaire output 431o. Alternatively, the configurable lighting system 409 operates a selected number but not all of the emitters of the second emission matrix of the general illumination device 410 to output general illumination light through some but not all of the area of the luminaire output 431o.

As noted, the host processor system 415 is coupled to the communication interface(s) 417. In the example, the communication interface(s) 417 offer a user interface function or communication with hardware elements providing a user interface for the configurable lighting system 409. The communication interface(s) 417 may communicate with other control elements, for example, a host computer of a building control and automation system (BCAS). The communication interface(s) 417 may also support device communication with a variety of other equipment of other parties having access to the configurable lighting system 409 in an overall/networked lighting system encompassing a number of lighting devices 409, e.g. for access to each configurable lighting system 409 by equipment of a manufacturer for maintenance or access to an on-line server for downloading of programming instruction or configuration data for setting aspects of luminaire operation.

In an example of the operation of the configurable lighting system 409, the processor 423 receives a configuration file 428 via one or more of the communication interfaces 417. The processor 423 may store, or cache, the received configuration file 428 in storage/memories 425. The file may include data or any desired image or video (sequence of images), or the processor 423 may receive separate video or still image data via one or more of the communication interfaces 417. The image data may be stored, as part of or along with the received configuration file 428, in storage/memories 425. Alternatively, image data (e.g. video) and/or general illumination light setting data may be received as streaming data and used to drive the display 419 in real-time.

The driver system 413 may deliver the image data directly to the image display 419 for presentation or may convert the image data into a signal or data format suitable for delivery to a particular implementation of the image display 419. For example, the image data may be video data formatted according to compression formats, such as H.264 (MPEG-4 Part 40), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like. For example, if floating point precision is needed, options are available, such as OpenEXR, to store 32-bit linear values. In addition, the hypertext transfer protocol (HTTP), which supports compression as a protocol level feature, may also be used. For at least some versions of the display 419 offering a low resolution image output, higher resolution source image data may be down-converted to a lower resolution format, either by the host processor system 415 or by processing in the circuitry of the driver system 413.

For illumination control, the configuration information in the file 428 may specify operational parameters of the controllable configurable lighting system 409, such as light intensity, light color characteristic, and the like for light from the source 419. The processor 423 by accessing programming 427 and using software configuration information 428, from the storage/memories 425, controls operation of the driver system 413, and through that driver system 413 controls the illumination device 410, e.g. to achieve a predetermined illumination light output intensity and/or color characteristic for a general illumination application of the configurable lighting device 431 and to provide a selected image display output, as discussed earlier.

A software configurable lighting device such as system 409 with device 431 may be reconfigured, e.g. to change the image display output and/or to change one or more parameters of the illumination light output, by changing the corresponding aspect(s) of the configuration data file 428, by replacing the configuration data file 428, by selecting a different file from among a number of such files already stored in the data storage/memories 425 or adjusting such data in response to an input from a user or an instruction received via a network.

In other examples, the configurable lighting system 409 may be programmed to transmit information on the light output from the configurable lighting device 431. Examples of information that the configurable lighting system 409 may transmit in this way include a code, e.g. to identify the configurable lighting device 431 and/or the configurable lighting system 409 or to identify the luminaire location. Alternatively or in addition, the light output from the configurable lighting device 431 may carry downstream transmission of communication signaling and/or user data. The information or data transmission may involve adjusting or modulating parameters (e.g. intensity, color characteristic, distribution, or the like) of the illumination light output of the general illumination device 410 or an aspect of the light output from the display 419. Transmission from the display 419 may involve modulation of the backlighting of the particular type of display. Another approach to light based data transmission from the display 419 may involve inclusion of a code representing data in a portion of a displayed image, e.g. by modulating individual emitter outputs. The modulation or image coding typically would not be readily apparent to a person in the illuminated area who may observe the luminaire operations but would be detectable by an appropriate receiver. The information transmitted and the modulation or image codding technique may be defined/controlled by configuration data or the like in the memories/storage 425. Alternatively, user data may be received via one of the interfaces 417 and processed in the controller 411 to transmit such received user data via light output from the configurable lighting device 431.

Apparatuses implementing functions like those of configurable lighting system 409 may take various forms. In some examples, some components attributed to the configurable lighting system 409 may be separated from the general illumination device 410 and the image display 419 in the configurable lighting device 431. For example, a configurable lighting system 409 may have all of the above hardware components on or within a single hardware platform as generally shown in FIG. 16 or in different somewhat separate units. In a particular example, one set of the hardware components may be separated from one or more instances of the controllable configurable lighting device 431, e.g. such that one host processor system 415 may control several lighting devices 431 each at a somewhat separate location wherein one or more of the controlled lighting devices 431 are at a location remote from the one host processor system 415. In such an example, a driver system 413 may be located near or included in a combined platform with each configurable lighting device 431. For example, one set of intelligent components, such as the microprocessor 423, may control/drive some number of driver systems 413 and associated controllable luminaires 431. Alternatively, there may be one overall driver system 413 located at or near the host processor system 415 for driving some number of lighting devices 431. It also is envisioned that some systems 409 may not include or be coupled to all of the illustrated elements, such as the sensor(s) 421 and the communication interface(s) 417. For convenience, further discussion of the configurable lighting system 409 of FIG. 16 will assume an intelligent implementation of the configurable lighting system 409 that includes at least the illustrated components.

In addition, the configurable lighting device 431 is not size restricted. For example, each configurable lighting device 431 may be of a standard size, e.g. 2-feet by 2-feet (2×2), 2-feet by 4-feet (2×4), or the like, and arranged like tiles for larger area coverage (see FIG. 2). Alternatively, one configurable lighting device 431 may be a larger area device that covers a wall, a part of a wall, part of a ceiling, an entire ceiling, or some combination of portions or all of a ceiling and wall.

Figure 17:
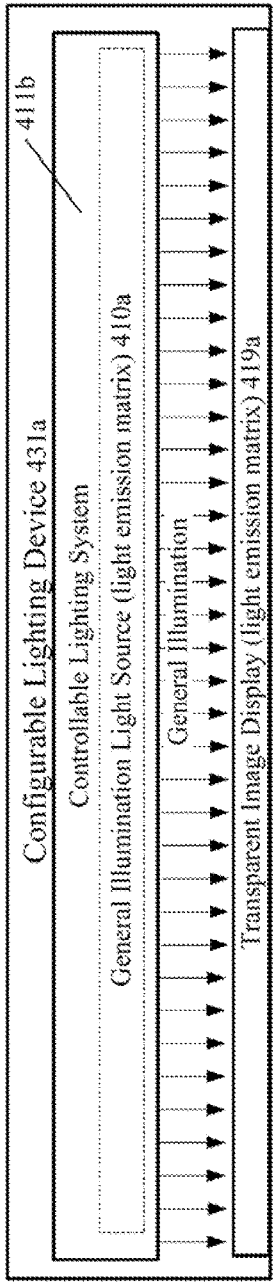
FIGS. 17 to 19 are functional block diagrams of different examples of the luminaire in the device of FIG. 16, which may support concurrent display image light output and illumination light output.
Figure 18:
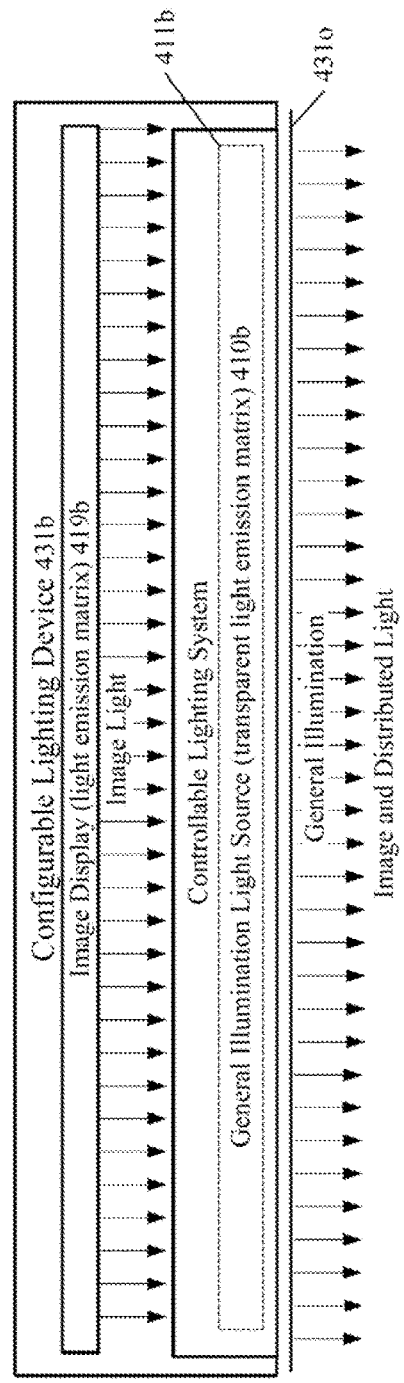
Figure 19:
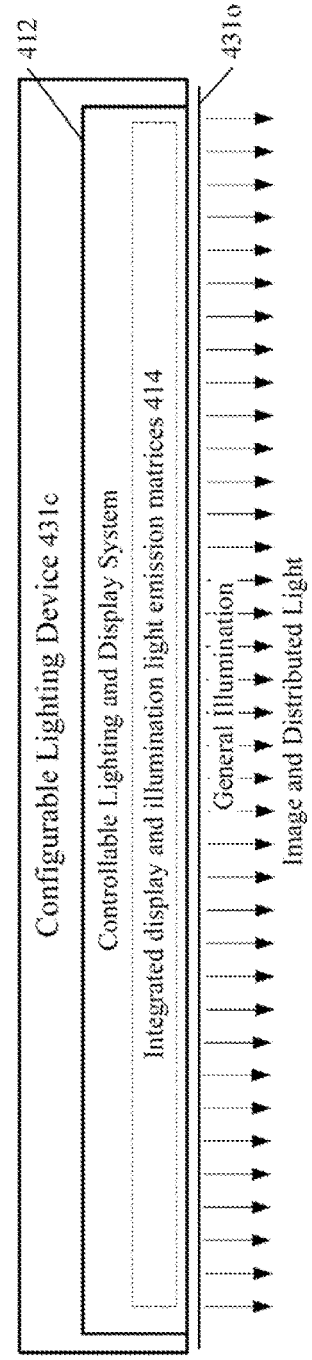

Lighting equipment like that disclosed in the example of FIG. 16, may be used with various implementations of the configurable lighting device 431, which may also include one or more of the noise reduction structures discussed earlier with regard to FIGS. 3 to 15. Although several examples of configurable lighting device implementations have been briefly discussed above, it may be helpful to consider some examples in more detail. FIGS. 17 to 19 provide high level functional illustrations of several general categories of the various luminaire implementations.

In FIG. 17, the configurable lighting device 431*a* utilizes a transparent implementation of the display 419*a*, and illumination light from the general illumination device 410 passes through and is combined with the image output light from the display 419*a*, for combined light emission through the device output surface 431*o* (which may correspond for example to output surface 121 in several of the device examples that include noise reduction structures). At a high level, the controllable luminaire 411*a* provides general illumination lighting via general illumination general illumination device 410. The general illumination device 410 is configurable with respect to light intensity. The light from the general illumination device 410 typically is white. The color characteristic(s) of the light from the general illumination device 410 also may be controllable. The general illumination device 410 may include or be coupled to output the illumination light via an optical spatial modulator (not shown). The device output surface 431*o* may be a surface of a panel of the display device 410*a* or of a diffuser adjacent to the display device, and a noise reduction structure may be formed in or around the output surface 431*o* as in several of the earlier examples.

The transparent image display 419*a* may be either a commercial-off-the-shelf image display device or an enhanced transparent image display device that allows general illumination lighting generated by general illumination device 410*a* to pass through. The general illumination lighting alone or in combination with light output from the display illuminates a space in compliance with governmental building codes and/or industry lighting standards. The illumination light source, for example, may support lumen output levels of 200 lumens or higher, with selective dimming capabilities. The image display 419*a* is configured to present an image. The presented image may be a real scene, a computer generated scene, a single color, a collage of colors, a video stream, or the like.

Examples of transparent displays suitable for application in software configurable lighting devices or luminaires, which use light emission matrices to emit output light of images, are disclosed U.S. patent application Ser. No. 15/198,712, filed Jun. 30, 2016, entitled "Enhancements of a Transparent Display to Form a Software Configurable Luminaire," U.S. patent application Ser. No. 15/211,272, filed Jul. 15, 2016, entitled "Multi-Processor System and Operations to Drive Display and Lighting Functions of a Software Configurable Luminaire," U.S. patent application Ser. No. 15/467,333 filed Mar. 23, 2017, entitled "Simultaneous Display and Lighting;" U.S. patent application Ser. No. 15/468,626, filed Mar. 24, 2017 entitled "Simultaneous Wide Lighting Distribution and Display;" and U.S. patent application Ser. No. 15/095,192, filed Apr. 41, 2016, entitled "Luminaire Utilizing a Transparent Organic Light Emitting Device Display," the entire contents all of which are incorporated herein by reference. These incorporated applications also disclose a variety of implementations of a general illumination light source including a second light emission matrix co-located the with an emission matrix of a transparent display.

The present teachings also apply to luminaires in which the general illumination light source, with the second emission matrix, is transparent with respect to light from the matrix of the display. FIG. 18 is a high level block diagram illustration of an example of this approach. In such an implementation 431b of the luminaire, the second emission matrix may include a transparent emitter matrix of LEDs, OLEDs, etc. similar to any of the examples of the display emission matrix discussed above, to implement the general Illumination device 410b. The configurable lighting device 431b also includes a display 419b, including a suitable image light generation matrix. The display 419b may be an off-the-shelf display. Examples of such a configurable lighting device are disclosure in U.S. patent application Ser. No. 15/424,208, filed Feb. 3, 2017, entitled "LUMINAIRE AND LIGHTING SYSTEM, COMBINING TRANSPARENT LIGHTING DEVICE AND DISPLAY COUPLED TO OUTPUT IMAGE VIA THE TRANSPARENT LIGHTING DEVICE," the entire contents of which are incorporated herein by reference.

The second emission matrix of the general illumination light source 410b may use a different number of emitters with different spacing between emitters and/or a different type of (e.g. higher intensity and/or different color, output distribution, etc.) specifically tailored to support the general illumination application of the light provided by the general illumination device 410b. Although not shown, an optical spatial modulator (or array of modulator cells) may be provided in association with the general illumination device 410b. Another implementation of this type of lighting device may have the second emission matrix mounted around another at least partially transparent component, such as a light guide, and the display positioned to emit light of the image through the a transparent portion of the other component (e.g. the light guide). A surface of the transparent component may serve as a panel of the lighting device 431b having the light output surface 431o. Again, a noise reduction structure may be formed in or around the output surface 431o as in several of the earlier examples.

The present teachings also encompass lighting device implementations 431c (FIG. 19) in which a controllable lighting and display system 412 incorporates functions/emitters of the two matrices together at 414, for example on a single board. Although physically integrated, the emitters are logically operated as two independently controllable emission matrices (one for display and another for general illumination. Examples of such a lighting device or luminaire are disclosed in U.S. patent application Ser. No. 15/611,349, filed Jun. 1, 2107, entitled "ILLUMINATION AND DISPLAY CONTROL STRATEGIES, TO MITIGATE INTERFERENCE OF ILLUMINATION LIGHT OUTPUT WITH DISPLAYED IMAGE LIGHT OUTPUT," the entire contents of which are incorporated herein by reference (but see particularly FIGS. 8 to 10 of the Ser. No. 15/611,349 and the description thereof). Such an implementation of the display system 412 may include a diffuser or other panel through which the emitters of the integrated system 412 output light for illumination and presentation of the image. The diffuser or other panel may provide the light output surface 431o of the device 431c, and a noise reduction structure may be formed in or around the output surface 431o as in several of the earlier examples.

The example devices of FIGS. 15 to 19 may include noise reduction structures on housing components not shown in those drawings.

Figure 20:
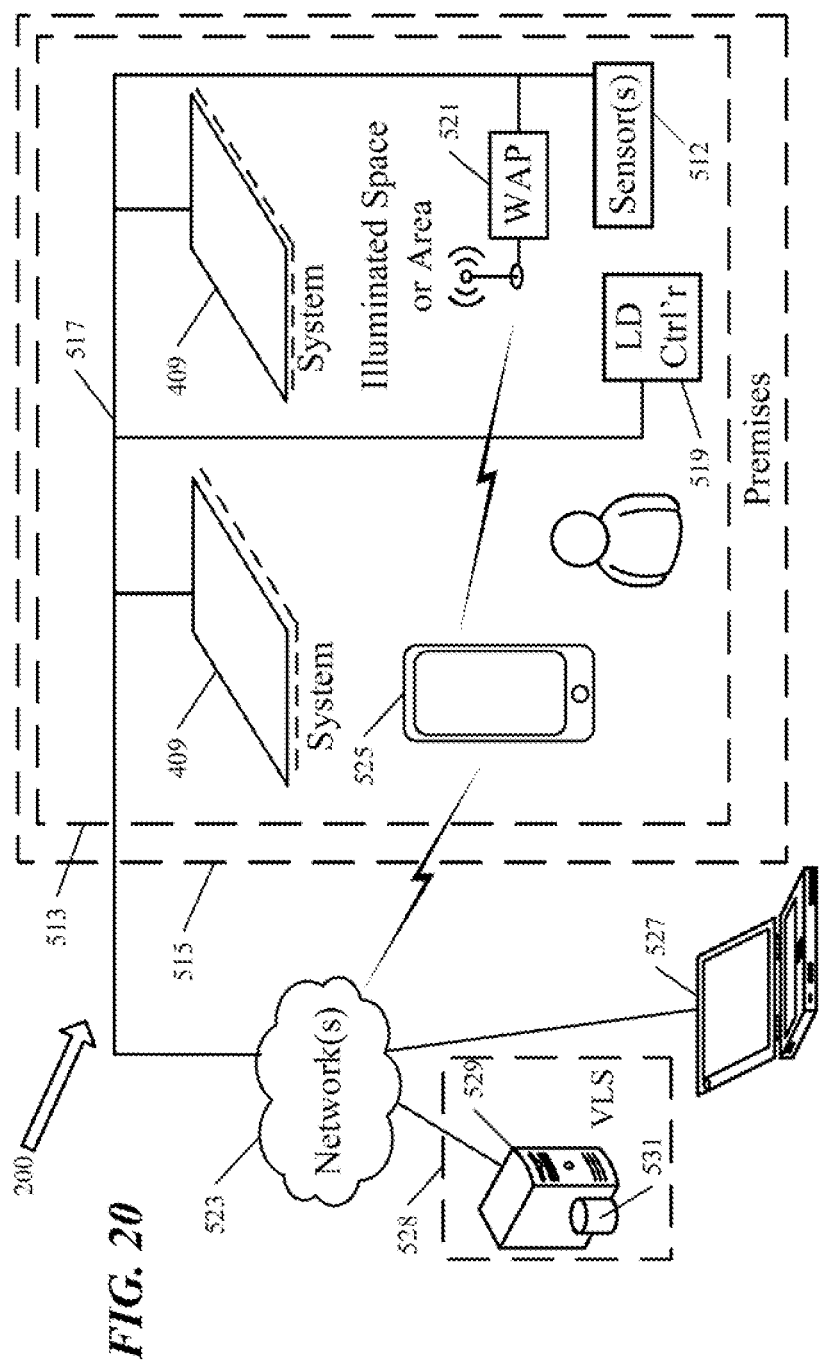
FIG. 20 is a high-level functional block diagram of a system including a number software configurable lighting devices that may display an image and provide general illumination.

It may be helpful to consider a high-level example of a system including a number of software configurable lighting systems 409, with reference to FIG. 20. That drawing illustrates a lighting system 500 for providing configuration or setting information, e.g. based on a user selection, to at least one software configurable lighting system 409 of any of the types discussed herein. Although shown somewhat separately in FIG. 20, the configurable devices (431 of FIG. 16) of the lighting systems 409 may be deployed as shown in or described with regard to FIG. 2 above. Each of the configurable lighting devices of systems 409 may include a noise reduction structure or an active noise reduction capability.

The system example 500 shown in FIG. 20 includes a number of such lighting systems 409. For purposes of discussion of FIG. 20, it is assumed that each software configurable lighting system 409 generally corresponds in structure to the block diagram illustration of a lighting system 409 in FIG. 16, with the illumination light source and display device structured/located to operate as a configurable lighting device 431 as discussed in various other examples above. The example of the lighting system 500 in FIG. 20 also includes a number of other devices or equipment configured and coupled for communication with at least one of the software configurable lighting systems 409.

In the lighting system 500 of FIG. 20, the software configurable lighting systems 409, as well as some other elements of system 500, are installed within a space or area 513 to be illuminated at a premises 515. The premises 515 may be any location or locations serviced for lighting and other purposes by such a system 500 of the type described herein. Lighting devices, such as lighting systems 409, that are installed to provide general illumination lighting in the premises 515 typically comply with governmental building codes (of the respective location of the premises 515) and/or lighting industry standards. Most of the examples discussed below focus on indoor building installations, for convenience, although the system may be readily adapted to outdoor lighting. Hence, the example of lighting system 500 provides configurable lighting (illumination and display) and possibly other services in a number of service areas in or associated with a building, such as various rooms, hallways, corridors or storage areas of a building and an outdoor area associated with a building. Any building forming or at the premises 515, for example, may be an individual or multi-resident dwelling or may provide space for one or more enterprises and/or any combination of residential and enterprise facilities. A premises 515 may include any number of such buildings, and in a multi-building scenario the premises may include outdoor spaces and lighting in areas between and around the buildings, e.g. in a campus (academic or business) configuration.

The system elements, in a system like lighting system 500 of FIG. 20, may include any number of software configurable lighting systems 409 as well as one or more lighting controllers 519. The lighting controller 519 may be an automated device for controlling lighting, e.g. based on timing conditions; and/or the lighting controller 519 may provide a user interface. Lighting device (LD) controller 519 may be configured to provide control of lighting related operations (e.g., ON/OFF, intensity or brightness, color characteristic(s), etc.) of any one or more of the lighting systems 409. A lighting controller 519, for example, may take the form of a switch, a dimmer, or a smart control panel including a graphical, speech-based and/or touch-based user interface, depending on the functions to be controlled through device 519.

A lighting system 409 may include a sensor (as in FIG. 16). In the example, other system elements may also include one or more standalone implementations of sensors 512. Sensors, for example, may be used to control lighting functions in response to various detected conditions, such as occupancy or ambient light. Other examples of sensors include light or temperature feedback sensors that detect conditions of or produced by one or more of the lighting devices. If separately provided, the sensors may be implemented in intelligent standalone system elements such as shown at 512 in the drawing. Alternatively, sensors may be incorporated in one of the other system elements, such as one or more of the lighting systems 409 and/or the lighting controller 519.

The on-premises system elements 409, 512, 519, in a system like the system 500 of FIG. 20, are coupled to and communicate via a data network 517 at the premises 515. The data network 517 may be a wireless network, a cable network, a fiber network, a free-space optical network, etc.; although the example shows connection lines as may be used in a hard-wired or fiber type network implementation. The data network 517 in the example also includes a wireless access point (WAP) 521 to support communications of wireless equipment at the premises. For example, the WAP 521 and network 517 may enable a user terminal for a user to control operations of any lighting system 409 at the premises 513. Such a user terminal is depicted in FIG. 20, for example, as a mobile device 525 within premises 515, although any appropriate user terminal may be utilized. However, the ability to control operations of a lighting system 409 may not be limited to a user terminal accessing data network 517 via WAP 521 or other on-premises point of access to the network 517. Alternatively, or in addition, a user terminal such as laptop 527 located outside premises 515, for example, may provide the ability to control operations of one or more lighting systems 409 via one or more other networks 523 and the on-premises data network 517. Network(s) 523 may include, for example, a local area network (LAN), a metropolitan area network (MAN), a wide area network (WAN) or some other private or public network, such as the Internet.

Data network communications allow installation of configuration files or streaming of configuration instructions/data to the lighting systems 409 at the premises. Such data communications also may allow selection among installed configuration files in any lighting system 409 that stores more than one such file. In another example, a memory device, such as a secure digital (SD) card or flash drive, containing configuration data may be connected to one or more of the on-premises system elements 409, 512 or 519 in a system like system 500 of FIG. 20.

For lighting operations, the system elements (409, 512 and/or 519) for a given service area 513 are coupled together for network communication with each other through data communication media to form a portion of a physical data communication network. Similar elements in other service areas of the premises are coupled together for network communication with each other through data communication media to form one or more other portions of the physical data communication network at the premises 515. The various portions of the network in the service areas in turn are coupled together to form a data communication network at the premises, for example to form a LAN or the like, as generally represented by network 517 in FIG. 20. Such data communication media may be wired and/or wireless, e.g. cable or fiber Ethernet, Wi-Fi, Bluetooth, or cellular short range mesh. In many installations, there may be one overall data communication network 517 at the premises. However, for larger premises and/or premises that may actually encompass somewhat separate physical locations, the premises-wide network 517 may actually be built of somewhat separate but interconnected physical networks utilizing similar or different data communication media.

System 500 also includes server 529 and database 531 accessible to a processor of server 529. Although FIG. 20 depicts server 529 as located outside premises 515 and accessible via network(s) 523, this is only for simplicity and no such requirement exists. Alternatively, server 529 may be located within premises 515 and accessible via network 517. In still another alternative example, server 529 may be located within any one or more system element(s), such as lighting system 409, lighting controller 519 or sensor 512. Similarly, although FIG. 20 depicts database 531 as physically proximate server 529, this is only for simplicity and no such requirement exists. Instead, database 531 may be located physically disparate or otherwise separated from server 529 and logically accessible by server 529, for example via network 517.

Database 531 in this example is a collection of configuration information files for use in conjunction with one or more of software configurable lighting systems 409 in premises 515 and/or similar systems 409 of the same or other users in other areas or at other premises. The image and lighting configuration information may be separate files or combined into one configuration file for each overall lighting device output performance configuration or setting, or each image and each set of illumination light configuration information may be in separate files. For general illumination lighting, a setting or configuration file may specify intensity performance at various dimming levels and/or one or more color characteristics for general illumination; and such configuration information may include distribution settings for a lighting device 431 that also incorporates spatial optical modulation capabilities for the illumination light output.

The software configurable lighting system 409 is configured to set illumination light generation parameters of the light source and possibly set modulation parameters for any spatial modulator in accordance with a selected configuration information file. For example, a selected configuration information file from the database 531 may enable a software configurable lighting system 409 to achieve a performance corresponding to a selected type or of existing hardware luminaire or lighting device for a general illumination application or any other arbitrarily designed/selected general illumination performance. Thus, the combination of server 529 and database 531 may represent a "virtual luminaire store" (VLS) 528 or a repository of available configurations that enable a software configurable lighting system 409 to selectively function like any one of a number of real or imagined luminaires represented by the available illumination configurations.

Display images may be selected through the store 528 or obtained from other image sources. Some examples entail loading a single configuration information file onto a software configurable lighting system 409, however, this may only for simplicity. Lighting system 409 may receive one, two or more configuration information files and each received file may be stored within lighting system 409. In such a situation, a software configurable lighting system 409 may, at various times, operate in accordance with configuration information in any selected one of multiple stored files, e.g. operate in accordance with first configuration information during daylight hours and in accordance with second configuration information during nighttime hours or in accordance with different file selections from a user operator at different times for different intended uses of the space 513. Alternatively, a software configurable lighting system 409 may only store a single configuration information file. In this single file alternative situation, the software configurable lighting system 409 may still operate in accordance with various different configuration information, but only after receipt of a corresponding configuration information file which replaces any previously received file(s). In a further alternative, some or all of the relevant configuration information may be streamed to a lighting device more or less in real time.

As shown by the above discussion of FIG. 20, although many intelligent processing functions are implemented in the lighting system 409 or the broader system 400, at least some functions may be implemented via communication with general purpose computers or other general purpose user terminal devices, although special purpose devices may be used. Many of the processing and control functions of the configurable lighting system 409 providing general illumination and image display and/or a system 400 of such devices may be implemented in part by utilizing firmware or software, for example, using executable instructions of a program and/or data for the configurable lighting system 409 (e.g. as shown in FIG. 16 or FIG. 20). If noise reduction involves inclusion of active technology (as in the above incorporated Ser. No. 15/948,401 application), the active noise reduction functions of the configurable lighting system 409 may be implemented in part by utilizing firmware or software, for example, using executable instructions of a program and/or data for the configurable lighting system 409.

A network or host computer platform, as may typically be used to generate and send programming, illumination setting data or image data for installation or updates in a configurable lighting device includes a data communication interface for packet data communication via the particular type of available network. The server also includes a central processing unit (CPU), in the form of one or more processors, for executing program instructions. The server hardware platform typically includes an internal communication bus, program storage and data storage for various image files, illumination setting data files or other data files to be processed and/or communicated by the server, although the server often receives programming and data via network communications. In general, the hardware elements, operating systems and programming languages of such server computers may be conventional in nature. Of course, the server functions may be implemented in a distributed fashion on a number of similar computer hardware platforms, to distribute the processing load.

A computer configured as a server may be accessible or have access to a configurable lighting system 409 via the communication interfaces 417 of the lighting system 409. For example, the server may respond to a user request for an image and/or a configuration information file to send the requested information to a communication interface 417 of the lighting system 409. The information of a configuration information file may be used to configure a software configurable lighting device, such as lighting system 409, to set light output parameters comprising: (1) light intensity, (2) light color characteristic, (3) spatial modulation, or (4) image display in accordance with the received information.

A computer type user terminal device, such as a desktop or laptop type personal computer (PC), similarly includes a data communication interface CPU, main memory (such as a random access memory (RAM)) and one or more disc drives or other mass storage devices for storing user data and the various executable programs. The hardware platform of a network computer or of a terminal computer may use a RAM type main memory and a hard disk drive for mass storage of data and programming, whereas a mobile device includes a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs. The mobile device typically uses a touchscreen type display, where the display is controlled by a display driver, and user touching of the screen is detected by a touch sense controller. In general, the hardware elements, operating systems and programming languages of such computer and/or mobile user terminal devices also are conventional in nature.

The user device, such as a mobile device or personal computer or the like, may also interact with the configurable lighting system 409 in order to enhance the user experience. For example, third party applications stored as programs on such terminal equipment may correspond to programming 427 at the configurable lighting system 409, to allow the user to manipulate control parameters of a software configurable lighting system 409, such as image display and general illumination lighting settings.

The lighting system 409 in other examples is configured to perform visual light communication. In other examples, the lighting device 109 is configured with programming that enables the lighting device 109 to "learn" behavior. For example, based on prior user interactions with the system 400, the lighting system 409 will be able to use artificial intelligence algorithms stored in memory 425 to predict future user behavior with respect to a space.

Also, aspects of the operation of a configurable lighting device and/or any system interaction therewith, may involve some programming the configurable lighting device(s) or system element and any equipment in communication therewith. Program or data aspects of the technology discussed above therefore may be thought of as "products" or "articles of manufacture" typically in the form of executable programming code (firmware or software) or data that is carried on or embodied in a type of machine readable medium. This programming and/or control data is configured to implement operation of the configurable lighting device or intelligent system element or computer or the like, in one or more of the ways described above.

"Storage" type media include any or all of the tangible memory of configurable lighting devices, computers, user terminal devices, intelligent standalone sensors, processors or the like, or associated modules thereof, such as various volatile or non-volatile semiconductor memories, tape drives, disk drives and the like, which non-transitory devices may provide storage at any time for executable software or firmware programming and/or any relevant data or information. All or portions of the programming, image data and/or configuration data may at times be communicated through the Internet or various other telecommunication networks. Such communications, for example, may enable loading of the data or programming from one computer or processor into another, for example, from a management server or host computer of a lighting system or BCAS management system type service provider into any of the configurable lighting devices, or other intelligent system elements, etc. Thus, another type of media that may bear the programming or data elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible or "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A configurable lighting device, comprising:
   a controllable general illumination device configured to output illumination light sufficient for general illumination of an area;
   a display configured to output light as a representation of an image into the area, wherein the display is co-located with the general illumination device such that an available output region of the display towards the area at least substantially overlaps an available output region of the general illumination device towards the area;
   a panel having a light output surface configured and located such that light output from the general illumination device and light output from the display propagate out via the light output surface;
   a noise reduction structure comprising a plurality of openings formed in the light output surface, wherein the noise reduction structure is configured to passively reduce noise in the area; and
   a housing configured to support and at least partially contain the general illumination device, the display, and the noise reduction structure.

2. The lighting device of claim 1, wherein the light output surface is a surface of a panel of the general illumination device or of the display.

3. The lighting device of claim 1, further comprising a diffuser optically coupled to receive light outputs from the general illumination device and the display, wherein the light output surface is a surface of the diffuser.

4. The lighting device of claim 1, further comprising a bezel surrounding the light output surface, wherein the bezel comprises the noise reduction structure.

5. The lighting device of claim 4, wherein the noise reduction structure comprises a convex curved surface of the bezel.

6. The lighting device of claim 1, wherein the plurality of openings comprises a plurality of parallel slots.

7. The lighting device of claim 1, wherein the plurality of openings comprises a plurality of parallel channels arranged to form a Schroeder diffuser.

8. The lighting device of claim 1, wherein the plurality of openings comprises a plurality of holes, the plurality of holes in communication with a cavity positioned on a side of the at least one of the light output surface opposite the area.

9. The lighting device of claim 1, wherein the noise reduction structure further comprises a plurality of openings formed in a surface of the housing.

10. The lighting device of claim 9, wherein the plurality of openings comprises a plurality of parallel slots.

11. The lighting device of claim 9, wherein the plurality of openings comprises a plurality of parallel channels arranged to form a Schroeder diffuser.

12. The lighting device of claim 9, wherein the plurality of openings comprises a plurality of holes, the plurality of holes in communication with a cavity positioned on a side of the light output surface inside the housing surface and opposite the area.

13. The lighting device of claim 1, wherein the noise reduction structure comprises an acoustic diffuser.

14. The lighting device of claim 1, wherein at least a portion of one of the general illumination device and the display is at least substantially transmissive with respect to light output of the other of the general illumination device and the display.

15. The lighting device of claim 14, wherein a portion of the display is at least substantially transmissive with respect to light output of the general illumination device.

16. The lighting device of claim 14, wherein a portion of the general illumination device is at least substantially transmissive with respect to light output of the display.

17. The lighting device of claim 1, wherein:
the display comprises a matrix of display pixel emitters, each display pixel emitter being controllable to emit selected amounts of light of three or more different colors;
the general illumination device comprises a matrix of white light emitters; and
each white light emitter of the light emission matrix general illumination device is co-located with a display pixel emitter.

18. A system comprising the configurable lighting device of claim 1 and:
a driver system coupled to control light outputs generated by the display and the general illumination device; and
a processor coupled to the driver system, wherein the processor is configured to operate the display and the general illumination device via the driver system to implement functions, including functions to:
operate the display to output the light of the image via the output surface of the lighting device; and
operate the general illumination device to output illumination light sufficient for general illumination via the output surface of the configurable lighting device.

19. The system of claim 18, further comprising:
a memory; and
programming in the memory to configure the processor to implement the functions so that the operation of the display is configurable based on data of the image and the operation of the general illumination device is configurable based on illumination setting data.

20. The system of claim 18, wherein the lighting device is arranged as an array of contiguous configurable lighting devices, and the noise reduction structure is located between a surface of the light output surface and the display of each of the lighting devices.

* * * * *